United States Patent
Taniguchi et al.

(10) Patent No.: US 6,185,497 B1
(45) Date of Patent: Feb. 6, 2001

(54) APPARATUS FOR CONTROLLING BEHAVIOR OF VEHICLE USING BRAKES

(75) Inventors: Masahiko Taniguchi, Anjo; Tomohiro Katou, Toyohashi; Tosirou Nagata, Gifu; Nobuyoshi Onogi, Nagoya, all of (JP)

(73) Assignee: Denso Corporation, Kariya (JP)

( * ) Notice: Under 35 U.S.C. 154(b), the term of this patent shall be extended for 0 days.

(21) Appl. No.: 09/272,581

(22) Filed: Mar. 19, 1999

(30) Foreign Application Priority Data

Mar. 20, 1998 (JP) ................................. 10-072497
Jan. 19, 1999 (JP) ................................. 11-011054

(51) Int. Cl.$^7$ ............................. G06F 7/00; G06F 19/00; G06G 7/00
(52) U.S. Cl. ............................. 701/70; 701/71; 701/72; 303/140; 303/146; 303/147; 303/148
(58) Field of Search ................................. 701/70, 72, 71; 303/146, 147, 140, 188

(56) References Cited

U.S. PATENT DOCUMENTS

| | | | |
|---|---|---|---|
| 4,898,431 | 2/1990 | Karnopp et al. | 303/100 |
| 5,124,921 | 6/1992 | Jonner et al. | 701/70 |
| 5,876,101 | * | 3/1999 | Taniguchi et al. ............ 303/146 |
| 5,879,061 | * | 3/1999 | Koibuchi ............................. 303/146 |
| 5,928,302 | * | 7/1999 | Fukada ............................. 701/70 |
| 5,931,546 | * | 8/1999 | Nahashima et al. ............ 303/146 |
| 6,003,959 | * | 12/1999 | Katayose et al. ............ 303/146 |
| 6,026,343 | * | 2/2000 | Ogino ............................. 701/72 |

FOREIGN PATENT DOCUMENTS

| | | |
|---|---|---|
| 195 10 104 | 8/1996 | (DE) . |
| 197 12 827 | 10/1997 | (DE) . |
| 2 302 379 | 1/1997 | (GB) . |
| 8-99624 | 4/1996 | (JP) . |
| 8-142834 | 6/1996 | (JP) . |
| 8-244589 | 9/1996 | (JP) . |
| 9-2234 | 1/1997 | (JP) . |
| 9-226555 | 9/1997 | (JP) . |

* cited by examiner

Primary Examiner—William A. Cuchlinski, Jr.
Assistant Examiner—Ronnie Mancho
(74) Attorney, Agent, or Firm—Pillsbury Madison & Sutro LLP

(57) ABSTRACT

A vehicle behavior control apparatus is provided which is designed to estimate the state of behavior of a vehicle body and to apply the brakes to wheels for suppressing an unwanted change in behavior of the vehicle body. The apparatus determines a lateral momentum of the vehicle body during traveling to estimate the state of behavior of the vehicle body based on the speeds of the wheels and calculates a target braking effort to be produced by each of the brake actuators based on the state of behavior of the vehicle.

24 Claims, 19 Drawing Sheets

FIG. 1

APPARATUS FOR CONTROLLING BEHAVIOR OF VEHICLE USING BRAKES

BACKGROUND OF THE INVENTION

1. Technical Field of the Invention

The present invention relates generally to a behavior control apparatus for vehicles which monitors the behavior of a vehicle body and automatically regulates the braking effort applied to each wheel to control the behavior of the vehicle body.

2. Background Art

Japanese Patent First Publication No. 9-226555 discloses an automatic brake control system for vehicles designed to control brake pressure (i.e., wheel cylinder pressure) applied to each wheel as a function of traveling conditions of the vehicle. This system monitors the lateral acceleration acting on the vehicle, the direction of a turn, and the brake pedal effort produced by a vehicle operator to determine a target wheel speed of a compliance one of outside wheels during turning based on the speed of a front one of inside wheels and the lateral acceleration when no brakes are applied and to determine a target wheel speed of a front one of inside wheels during turning based on the speed of a front one of the outside wheels and the lateral acceleration when the brakes are being applied and the braking force applied to the wheels according to one of the target wheel speeds. In brief, a control reference value used in controlling a speed difference between the outside and inside wheels during turning based on the lateral acceleration is switched between states of applying the brakes and applying no brakes, thereby bringing the rotation of the right and left wheels into a preselected condition, e.g., by adjusting the speeds of the right and left wheels to have the same slip ratio for stability of vehicle motion.

The above conventional system, however, does not estimate a vehicle condition in the automatic brake control and may encounter the problems that the automatic brake control causes the deterioration of vehicle behavior and/or the lack of braking force. Specifically, when the automatic brake control is carried out without taking a dynamic balance of the whole of a vehicle body into account in determining a target controlled state of each wheel, it may cause the dynamic balance of the vehicle body or vehicle behavior to be deteriorated.

SUMMARY OF THE INVENTION

It is therefore a principal object of the present invention to avoid the disadvantages of the prior art.

It is another object of the present invention to provide a vehicle behavior control apparatus which estimates the state of behavior of a vehicle body accurately to determine a target controlled wheel(s) and which applies suitable braking efforts to the wheels.

It is a further object of the invention to provide a vehicle behavior control apparatus which is capable of estimating the state of behavior of a vehicle body accurately to control a preselected actuator.

According to one aspect of the invention, there is provided a vehicle behavior control apparatus. The vehicle behavior control apparatus comprises (a) a wheel speed sensor measuring speeds of wheels; (b) a brake actuators producing braking efforts applied to wheels of a vehicle; (c) a lateral momentum determining circuit determining a lateral momentum of a vehicle body during traveling; (d) a vehicle state estimating circuit estimating a state of behavior of the vehicle body based on the speeds of the wheels measured by the wheel speed sensor and the lateral momentum determined by the lateral momentum determining circuit; (e) a target braking effort determining circuit determining a target braking effort to be produced by each of the brake actuators based on the state of behavior of the vehicle estimated by the vehicle state estimating circuit; and (f) a braking effort regulating means for regulating the braking efforts produced by the brake actuators so as to agree with the target braking efforts, respectively, to control behavior of the vehicle body.

In the preferred mode of the invention, the vehicle state estimating circuit includes a wheel state variable determining means for determining a wheel state variable based on a difference in speed between the right wheel and the left wheel and estimates the state of behavior of the vehicle body based on the wheel state variable.

The wheels of the vehicle consists of a pair of front right and left wheels and a pair of rear right and left wheels. The wheel state variable determining means determines a front wheel state variable based on a difference in speed between the front right and left wheels and a rear wheel state variable based on a difference in speed between the rear right and left wheels. The vehicle state variable determining circuit estimates the state of behavior of the vehicle body based on the front and rear wheel state variables.

The wheel state variable means may alternatively determine a first diagonal wheel state variable indicative of stability in a diagonal direction of the vehicle body from the front right wheel to the rear left wheel based on a difference in speed between the front right wheel and the rear left wheel and a second diagonal wheel state variable indicative of stability in a diagonal direction of the vehicle body from the front left wheel to the rear right wheel based on a difference in speed between the front left and rear right wheels. The wheel state determining means estimates the state of behavior of the vehicle body based on the first and second diagonal wheel state variables.

The vehicle state estimating circuit may estimate the state of behavior of the vehicle body based on a front state variable and a rear state variable. The front state variable indicates stability of a front portion of the vehicle body and is determined based on a difference between the lateral momentum and the front wheel state variable. The rear state variable indicates stability of a rear portion of the vehicle body and is determined based on a difference between the lateral momentum and the rear wheel state variable.

The vehicle state estimating circuit may alternatively estimate the state of behavior of the vehicle body based on a first state variable and a second state variable. The first state variable indicates stability of a first diagonal portion of the vehicle body and is determined based on a difference between the lateral momentum and the first diagonal wheel state variable. The second state variable indicates stability of a second diagonal portion of the vehicle body and is determined based on a difference between the lateral momentum and the second diagonal wheel state variable.

The vehicle state estimating circuit determines a first state parameter indicating instability of the whole of the vehicle body based on the sum of the front and rear state variables and uses the first state parameter in estimating the state of behavior of the vehicle body.

The vehicle state estimating circuit may alternatively determine the first state parameter based on the sum of the first and second state variables and uses the first state parameter in estimating the state of behavior of the vehicle body.

The vehicle state estimating circuit determines a second state parameter indicating a location of a portion of the vehicle body which is unstable in behavior of the vehicle body based on a difference between the front and rear state variables and uses the second state parameter in estimating the state of behavior of the vehicle body.

The vehicle state estimating circuit may alternatively determine the second state parameter based on a difference between the first and second state variables and use the second state parameter in estimating the state of behavior of the vehicle body.

The vehicle state estimating circuit determines which of the wheels whose road-tire adhesion reaches a limit based on a value of the second state parameter.

The vehicle state estimating circuit classifies the state of behavior of the vehicle body into a plurality of different states based on the first and second state parameters.

The vehicle state estimating circuit classifies the state of behavior of the vehicle body into the different states by comparing the first state parameter with the second state parameter.

A turning state detecting means is provided for detecting a state of turning of the vehicle. The target braking effort determining circuit determines the target braking effort depending upon the state of turning of the vehicle.

The vehicle state estimating circuit includes a wheel lift determining means for determining whether any of the wheels is lifted up from a road surface or not based on the speeds of the wheels and the lateral momentum of the vehicle body and uses a result of the determination as the state of behavior of the vehicle body.

The wheel lift determining means includes a first-order lag momentum determining means for determining a time-lag momentum corresponding to a fist-order lag of the lateral momentum and estimates a speed of the inside wheel during cornering of the vehicle based on a difference between the time-lag momentum and the speed of the outside wheel to determine whether the inside wheel during cornering of the vehicle is lifted up from the road surface or not based on the estimated speed of the inside wheel.

The wheel lift determining means includes a wheel speed determining means for determining speeds of the inside and outside wheels during cornering of the vehicle. The wheel lift determining means subtracts the speed of the front inside wheel during cornering of the vehicle from a difference between the time-lag momentum and the speeds of the outside wheels to determine a rear inside wheel lift parameter and subtracts the speed of the rear inside wheel during cornering of the vehicle from the difference to determine a front inside wheel lift parameter.

The lateral momentum determining circuit includes either or both of a lateral acceleration sensor measuring a lateral acceleration acting on the vehicle body and a yaw rate sensor measuring a yaw rate of angular motion applied to the vehicle body.

According to the second aspect of the invention, there is provided a vehicle behavior control apparatus. The vehicle behavior control apparatus comprises (a) a wheel speed sensors measuring speeds of wheels; (b) a brake actuators producing braking efforts applied to wheels of a vehicle; (c) a lateral momentum measuring sensor measuring lateral motion of the vehicle body to determine a vehicle state variable; (d) a vehicle body portion state variable determining means for determining state variables of different portions of a vehicle body based on the speeds of the wheels; (e) a state parameter determining means for determining one of a first state parameter indicating instability of the whole of the vehicle body and a second state parameter indicating a location of one of the portions of the vehicle body which is unstable in behavior of the vehicle body based on the vehicle state variable and the state variables; (f) a target braking effort determining circuit determining a target braking effort to be produced by each of the brake actuators based on the one of the first and second state parameters; and (g) braking effort regulating means for regulating the braking efforts produced by the brake actuators so as to agree with the target braking efforts, respectively, to control behavior of the vehicle body.

According to the third aspect of the invention, there is provided a vehicle behavior control apparatus. The vehicle behavior control apparatus comprises: (a) a wheel speed sensor measuring speeds of wheels; (b) brake actuators producing braking efforts applied to wheels of a vehicle; (c) a lateral momentum determining circuit determining a lateral momentum of a vehicle body during traveling; (d) a wheel lift determining means for determining whether any of the wheels is lifted away from a road surface or not based on the speeds of the wheels and the lateral momentum of the vehicle body; and (e) an actuator driving means for driving a preselected actuator based on a result of the determination of the wheel lift determining means.

In the preferred mode of the invention, the wheels of the vehicle consists of a pair of front right and left wheels a pair of rear right and left wheels. The wheel lift determining means includes first-order lag momentum determining means for determining a time-lag momentum corresponding to a fist-order lag of the lateral momentum, a wheel speed determining means for determining speeds of the inside and outside wheels during cornering of the vehicle, and a lift parameter determining means for determining a front inside wheel lift parameter by subtracting the speed of the front inside wheel during cornering of the vehicle from a difference between the time-lag momentum and the speeds of the outside wheels and a rear inside wheel lift parameter by subtracting the speed of the rear inside wheel during cornering of the vehicle from the difference.

The lateral momentum determining circuit includes one of a lateral acceleration sensor measuring a lateral acceleration acting on the vehicle body and a yaw rate sensor measuring a yaw rate of angular motion applied to the vehicle body.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 1 is a hydraulic circuit diagram which shows a hydraulic system for a vehicle behavior control apparatus of the invention;

DESCRIPTION OF THE PREFERRED EMBODIMENT

Figure 1:
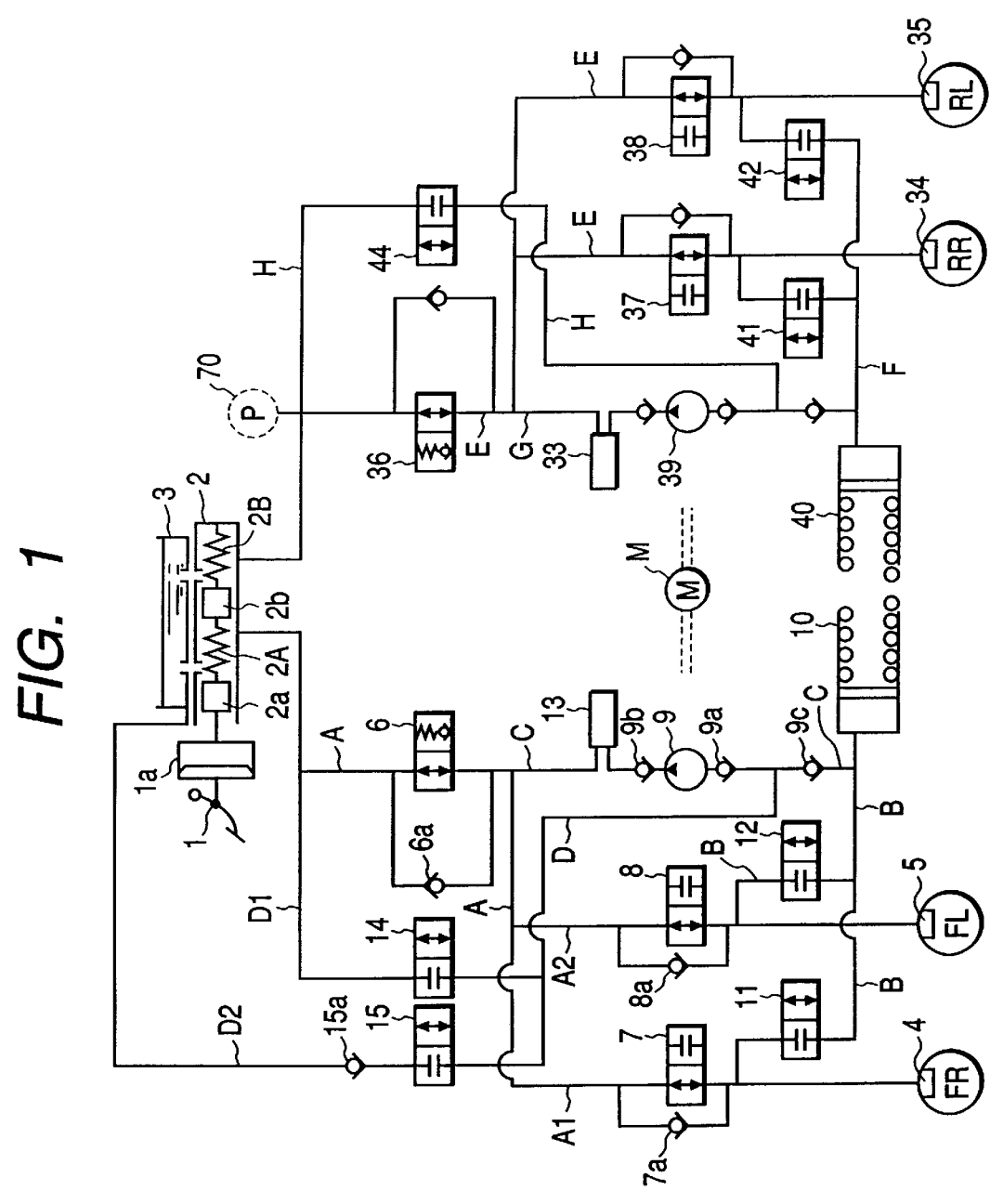
Figure 2:
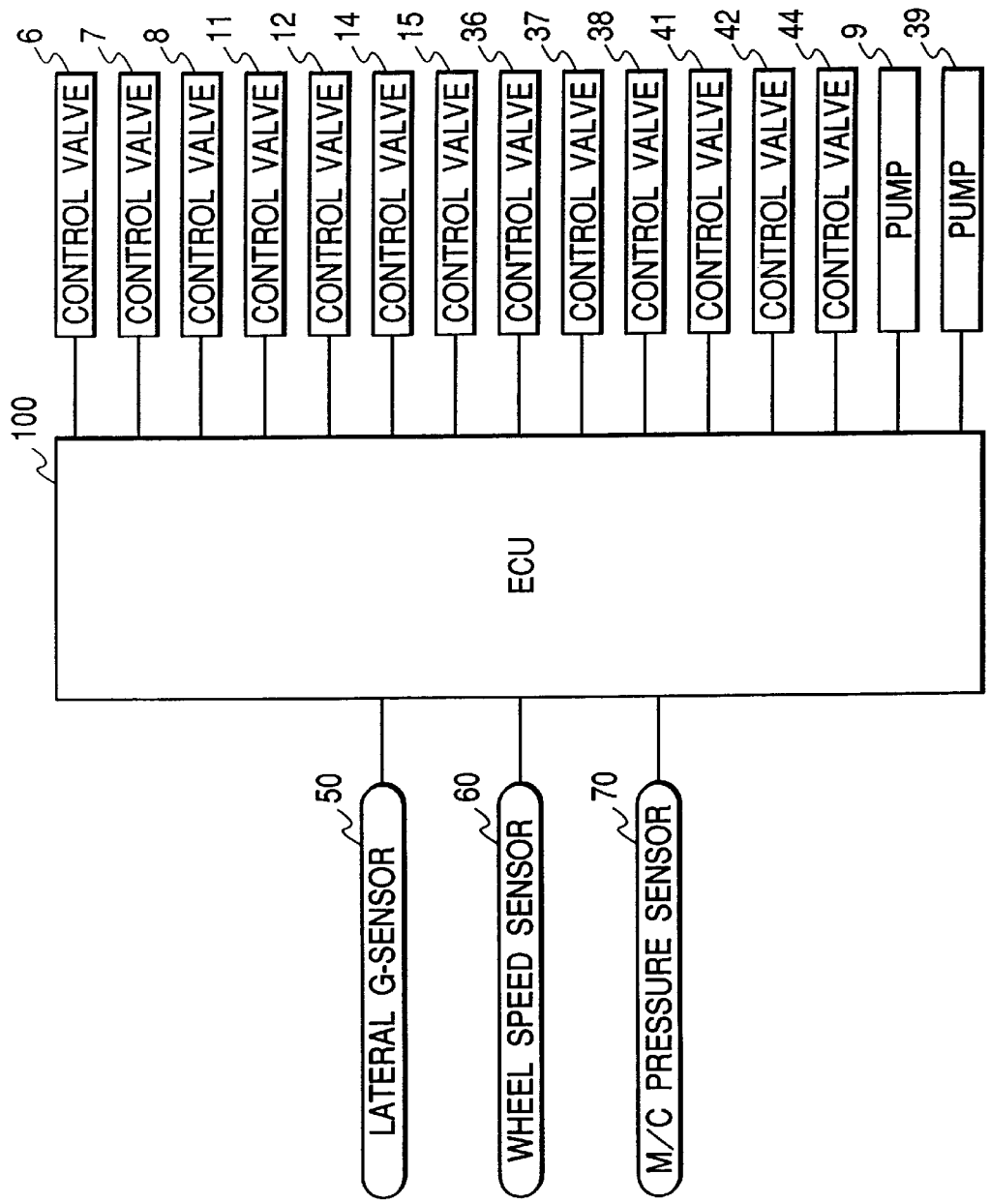
FIG. 2 is a block diagram which shows a vehicle behavior control apparatus of the invention.

Referring now to the drawings, wherein like numbers refer to like parts in several views, particularly to FIG. 1, there is shown a hydraulic system of a vehicle behavior control apparatus according to the present invention. The illustrated embodiment is used with, as one example, a rear-wheel drive vehicle equipped with a front hydraulic line for adjusting the braking force applied to right and left front wheels and a rear hydraulic line for adjusting the braking force applied to right and left rear wheels.

A brake pedal 1 is connected to a master cylinder 2 which serves as a hydraulic source producing brake pressure to be applied to each wheel. The master cylinder 2 is a tandem master cylinder in which two hydraulic pressure chambers are provided, one for each of the front and rear hydraulic lines. When the brake pedal 1 is depressed by a vehicle operator, it pushes pistons 2a and 2b through a brake booster 1a to develop hydraulic pressure within the master cylinder 2. The piston 2a, the brake booster 1a, and the brake pedal 1 are connected mechanically through a rod. The pistons 2a and 2b are connected to each other through a spring. A liquid-tight seal is disposed between the periphery of the pistons 2a and 2 and an inner wall of the master cylinder 2 to hermetically seal primary and secondary chambers 2A and 2B defined by the pistons 2a and 2b within the master cylinder 2. Within the primary and secondary chambers 2A and 2B, substantially the same hydraulic pressures is developed by the pedal effort. The second spring is also disposed between the piston 2b and an inner end of the master cylinder 2. The second spring serves to urge the brake pedal 1 to return to its initial position when released to speed the reduction in pressure within the master cylinder 2.

A master reservoir 3 is disposed above the master cylinder 2 which is filled with brake fluid and which communicates with the primary and secondary chambers 2A and 2B in the master cylinder 2 through fluid paths formed between the master reservoir 3 and the master cylinder 2. The fluid paths between the master reservoir 3 and the master cylinder 2 each have the diameter much smaller than the inner diameter of the master cylinder 2 to function as an orifice which develops differential pressure of the brake fluid when flowing from the master cylinder 2 to the master reservoir 3. When the brake pedal 1 is depressed to move the pistons 2a and 2b to the right, as viewed in the drawing, so that they close the fluid paths to block the fluid communication between the master reservoir 3 and the master cylinder 2, it will cause pressure in the primary and secondary chambers 2A and 2B to be elevated to develop the master cylinder pressure (i.e., the brake pressure).

The master cylinder pressure is delivered to first and second hydraulic lines A and E. The first and second hydraulic lines A and E, as clearly shown in FIG. 1, have substantially the same part of construction, and explanation of part of the second hydraulic line B identical with that of the first hydraulic line A will be omitted here.

The first hydraulic line A has a pair of branch lines A1 and A2 which lead to a wheel cylinder 4 for the front right wheel FR and a wheel cylinder 5 for the front left wheel FL, respectively. The wheel cylinders 4 and 5 each develop the wheel cylinder pressure acting as the braking force.

The first hydraulic line A has a differential pressure control valve 6 disposed upstream of the branch lines A1 and A2. The differential pressure control valve 6 is a two-position valve switchable between an open position and a differential pressure position. In the differential pressure position, the flow of the brake fluid both from the master cylinder 2 and from the wheel cylinders 4 and 5 is inhibited basically, but the flow of the brake fluid from the wheel cylinders 4 and 5 to the master cylinder 2 is allowed only when the fluid pressure in the wheel cylinders 4 and 5 exceeds the master cylinder pressure plus a set pressure (e.g., 50 kgf/cmm$^2$). The master cylinder pressure is not elevated above a set pressure. The pressure in the wheel cylinders 4 and 5 is, thus, held below a preselected level, thereby avoiding an excessive elevation in pressure in the first hydraulic line A which would cause breakage thereof. A check valve 6a is disposed in parallel to the differential pressure control valve 6. The check valve 6a allows the brake fluid to flow only from the master cylinder 2 to the wheel cylinders 4 and 5.

The branch lines A1 and A2 have disposed therein pressure elevation control valves 7 and 8, respectively, which selectively establish or block communication between the wheel cylinders 4 and 4 and the master cylinder 2 or an outlet port of a pump 9 during anti-skid control or vehicle behavior control. Check valves 7a and 8a are disposed in parallel to the pressure elevation control valves 7 and 8 which allow the brake fluid to flow only from the wheel cylinders 4 and 5 to the pressure elevation control valves 7 and 8, respectively.

Hydraulic lines B extend from portions of the branch lines A1 and A2 between the pressure elevation control valves 7 and 8 and the wheel cylinders 4 and 5, respectively, and connect with a reservoir 10. The hydraulic lines B have disposed therein pressure reduction control valves 11 and 12 which regulate the flow of the brake fluid from the wheel cylinders 4 and 5 to the reservoir 10 to control reduction in pressure in the wheel cylinders 4 and 5, respectively.

The pump 9 is disposed in a hydraulic line C extending from the reservoir 10 to the differential pressure control valve 6 and the wheel cylinders 4 and 5. Check valves 9a and 9b are installed across the pump 9 which allow the brake fluid to flow only from an inlet port to the outlet port of the pump 9. The check valves 9a and 9b may be built in the pump 9. The pump 9 may be a piston pump or a trochoid pump. The trochoid pump usually has a small fluid-flow pulsation and thus is useful when the pump 9 is activated frequently to perform a brake assist function. The pump 9 is driven by a motor M which also drives a pump 39 installed in the second hydraulic line E.

The brake fluid discharged from the pump 9 passes through a damper 13. The damper 13 suppresses the pulsation of the brake fluid from the pump 9.

The pump 9 sucks the brake fluid not only from the reservoir 10, but also from the primary chamber 2A of the master cylinder 2 and the master reservoir 3 through the hydraulic line D. The hydraulic line D connects at one end with the inlet port of the pump 9 and at the other end with branch lines D1 and D2 which lead to the primary chamber 2A and the master reservoir 3, respectively. The branch lines D1 and D2 have disposed therein control valves 14 and 15 which selectively establish and block communications between the pump 9 and the primary chamber 2A and between the pump 9 and the master reservoir 3, respectively. A check valve 15a is disposed in the branch line D2 to avoid the backflow of the brake fluid to the master reservoir 3. A check valve 9c is disposed in the hydraulic line C between the pump 9 and the reservoir 10 to inhibit the brake fluid entering the inlet port of the pump 9 from the primary chamber 2A or the master cylinder 3 from flowing into the reservoir 10. This is because there is a possibility that the flow of the brake fluid into the reservoir 10 from the primary chamber 2A or the master reservoir 3 disturbs the reduction in wheel cylinder pressure during the anti-skid control or the vehicle behavior control.

In a normal braking mode where the brakes are applied to the vehicle only by depression of the brake pedal 1, all the valves in the first hydraulic line A are in the illustrated positions so that the pressure in the primary chamber 2A is applied to the wheel cylinders 4 and 5 through the differential pressure control valve 6 and the pressure elevation control valves 7 and 8.

The second hydraulic line E, as can be seen from the drawing, is different in structure from the first hydraulic line A in that the branch line D2, the control valve 15, and the check valve 15a installed in the branch line D2 are not provided. Other arrangements are identical, and explanation thereof in detail will be omitted here.

The installation of the branch line D2 in the first hydraulic line A for pumping the brake fluid out of the master reservoir 3 is for the following reasons. Usually, the deceleration of the vehicle body during braking causes the load of the vehicle body to be shifted forward, thereby resulting in an increase in braking ability of the front wheels. This is also evident from a known ideal braking force distribution curve. Specifically, a longitudinal braking force (i.e., a road surface gripping force) and a lateral braking force (i.e., a side force) developed by the front wheels become greater than those developed by the rear wheels. The application of braking effort to at least one of the front right and left wheels is, thus, effective in controlling the vehicle behavior. However, when the brake pedal 1 is not depressed by the vehicle operator, it is difficult for the pump 9 to suck the brake fluid from the primary chamber 2A of the master cylinder 2 to elevate the wheel cylinder pressure quickly because of flow resistance resulting from negative pressure developed in the primary chamber 2A. In order to avoid this problem, the pump 9 is connected to the master reservoir 3 through the branch line D2 to allow the pump 9 to suck the brake fluid out of the master reservoir 3 at a less flow resistance. The reason that the branch line D4 is not provided in the second hydraulic line E for the rear brakes is because braking of the rear wheels is not usually useful in controlling the vehicle behavior, and it is not essential to increase the pressure in the rear wheel cylinders 34 and 35 quickly as compared with the front brakes.

The above described valves installed in the first and second hydraulic lines A and E are, as shown in FIG. 2, electrically controlled by an electronic control unit (ECU) 100. The ECU 100 consists essentially of a ROM, a RAM, an I/O interface, etc. and receives outputs of a lateral acceleration sensor 50, wheel speed sensors 60, and an M/C (master cylinder) pressure sensor 70 to provide control signals to the valves in the first and second hydraulic lines A and E. The lateral acceleration sensor 50 may be designed to measure the lateral acceleration acting on the vehicle body directly or alternatively implemented with a yaw rate sensor which measures the yaw rate of angular motion applied to the vehicle body. The wheel speed sensors 60 are provided, one for each of the front right and left wheels FR and FL and the rear right and left wheels RR and RL, and may be of an electromagnetic pickup type which outputs an electric signal as a function of speed of the wheel. The M/C pressure sensor 70 is, as shown in FIG. 1, disposed in a hydraulic line H between the master cylinder 2 and the control valve 44 and measures the pressure in the master cylinder 2.

Figure 3:
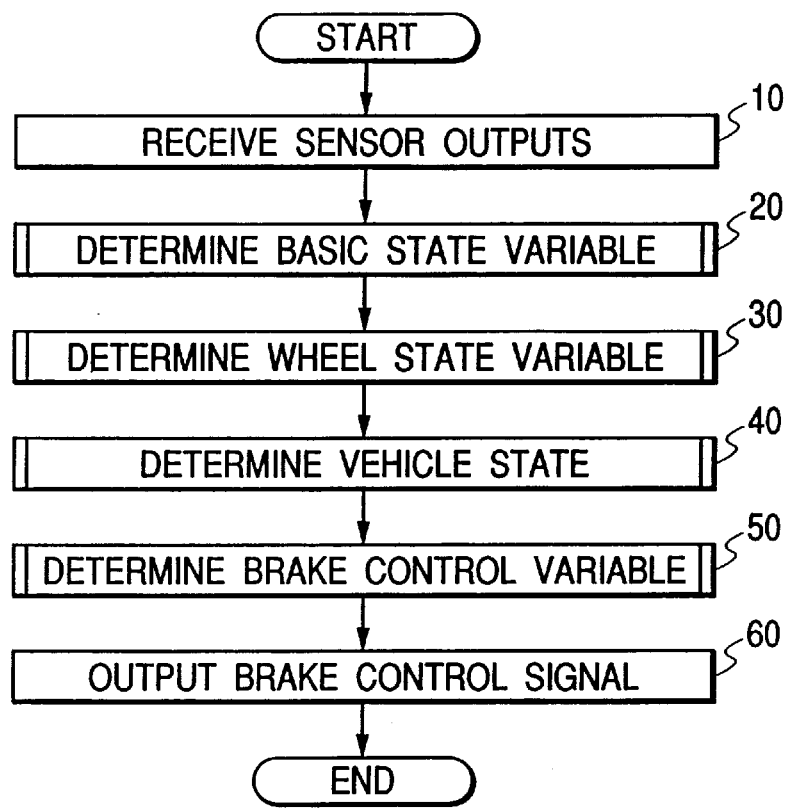
FIG. 3 is a flowchart of a main program executed to control the behavior of a vehicle.

FIG. 3 shows a flowchart of a program or sequence of logical steps performed by the ECU 100 to control the vehicle behavior.

Upon turning on of an ignition switch (not shown) of the vehicle, the program is entered, and the routine proceeds to step 10 wherein the ECU 100 receives outputs of the lateral acceleration sensor 50 and the wheel speed sensors 60.

Figure 4:
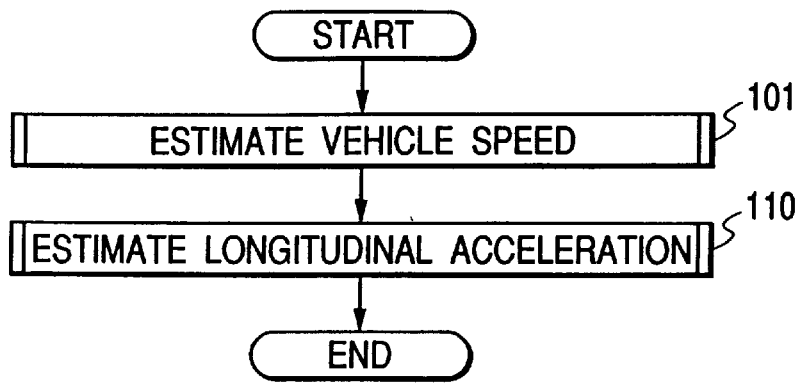
FIG. 4 is a flowchart of a sub-program executed in step 20 of FIG. 3 to determine basic state variables.

The routine proceeds to step 20 to determine basic state variables according to a sub-program shown in FIG. 4.

Figure 7:
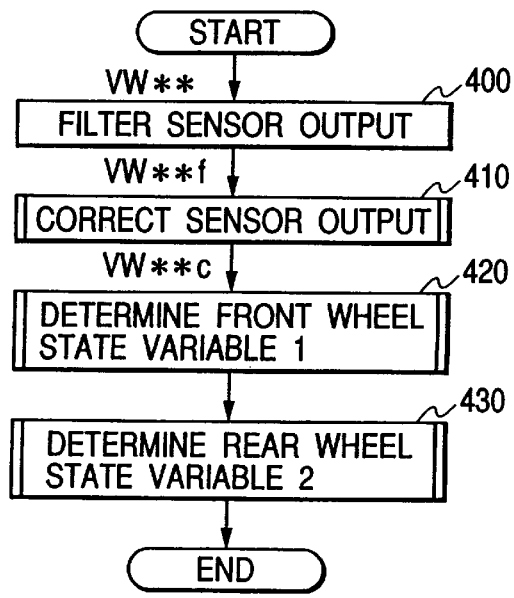
FIG. 7 is a flowchart of a sub-program executed in step 30 of FIG. 3 to determine front and rear wheel state variables.

The routine proceeds to step 30 to determine wheel state variables according to a sub-program shown in FIG. 7.

Figure 10:
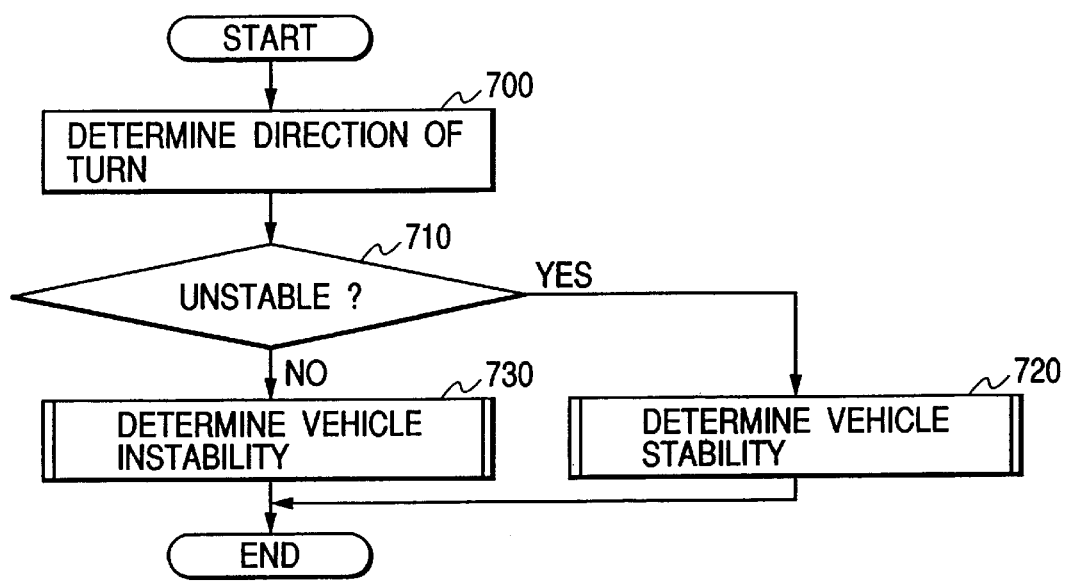
FIG. 10 is a flowchart of a sub-program executed in step 40 of FIG. 3 to determine the state of a vehicle.

The routine proceeds to step 40 to determine a vehicle state for estimating stability of the vehicle body according to a sub-program shown in FIG. 10.

Figure 16:
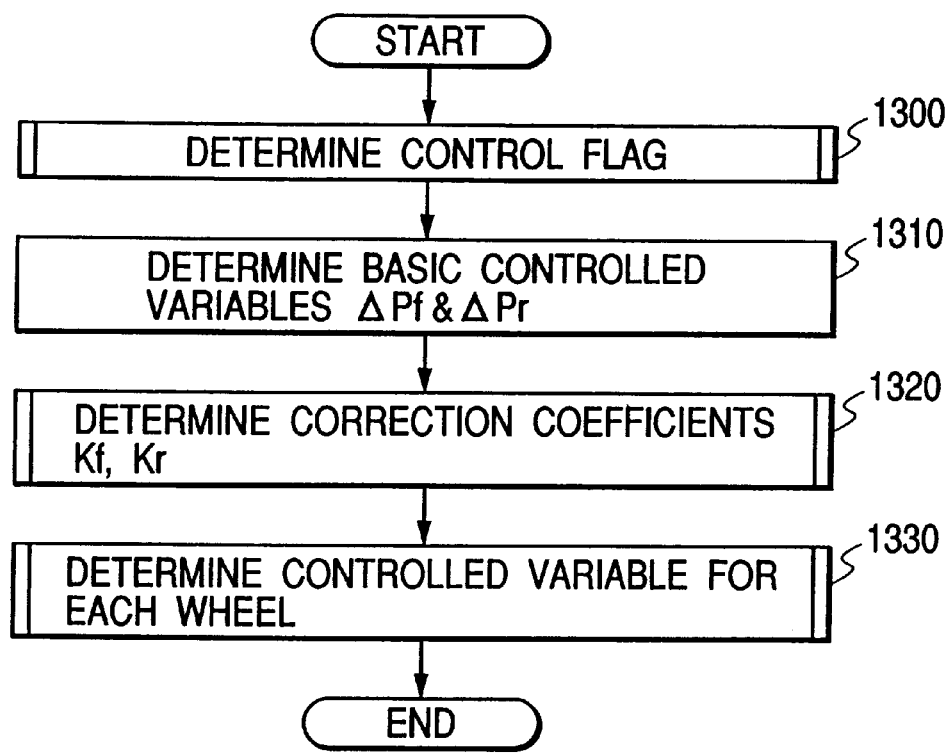
FIG. 16 is a flowchart of a sub-program executed in step 50 of FIG. 3 to determine a controlled variable for each wheel.

The routine proceeds to step 50 to determine a controlled variable for each wheel (i.e., the wheel cylinder pressure applied as the braking effort to each wheel) according to a sub-program shown in FIG. 16.

Figure 21:
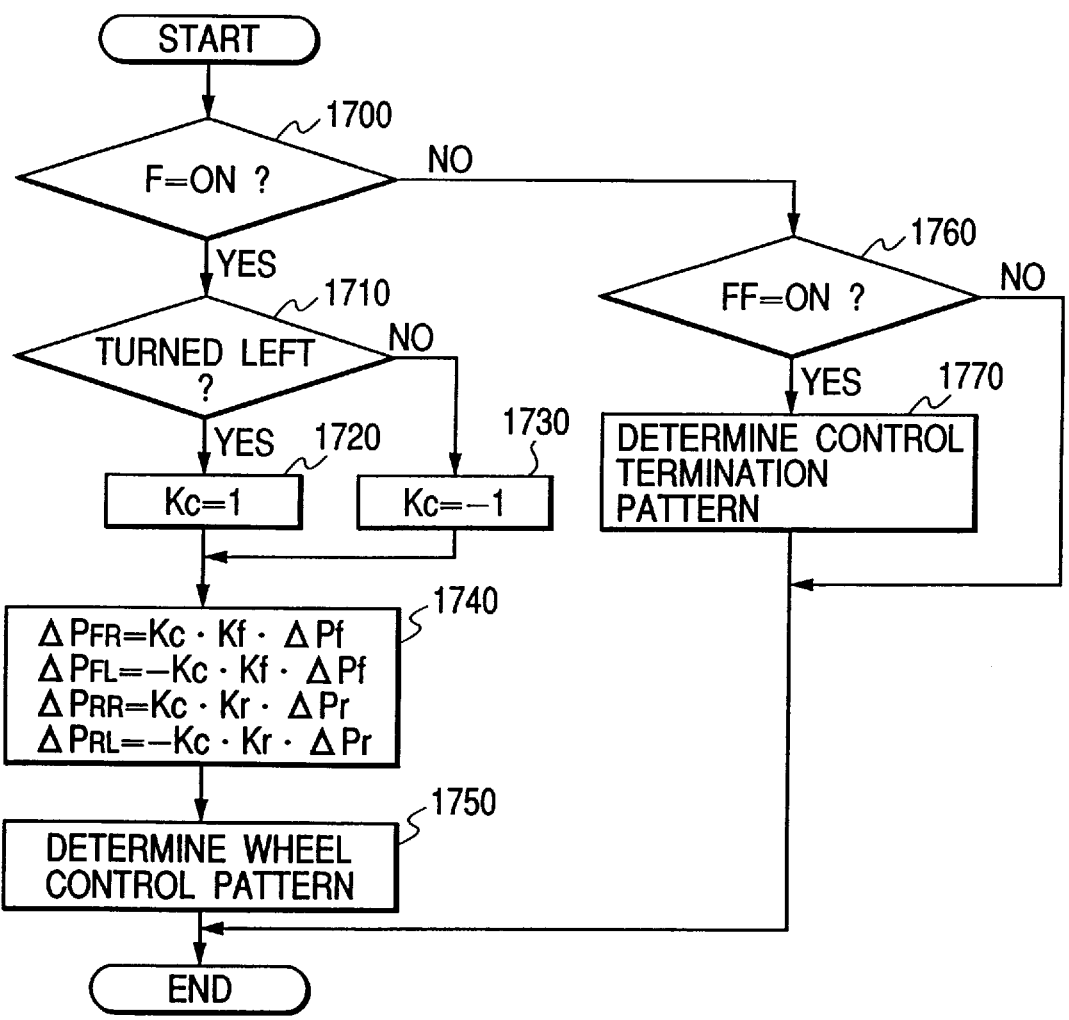
FIG. 21 is a flowchart of a sub-program executed in step 1330 of FIG. 16 to determine a controlled variable for each wheel.
Figure 22:
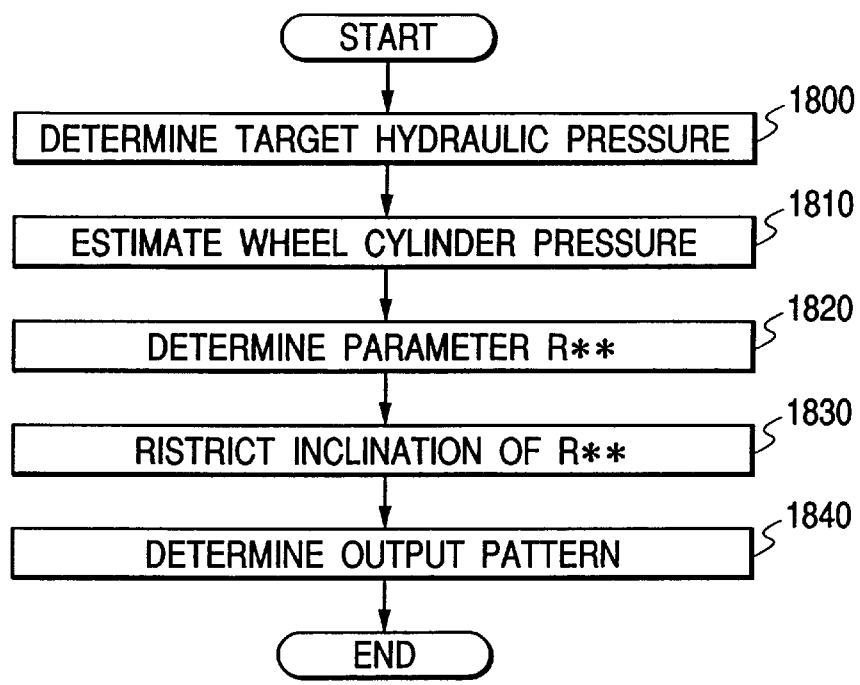
FIG. 22 is a flowchart of a sub-program executed in step 1750 of FIG. 21 to determine a control pattern for each wheel.

The routine proceeds to step 60 to output brake control signals (i.e., control signals for the valves in the first and second hydraulic lines A and E) according to a sub-program shown in FIGS. 21 and 22.

Referring to FIG. 4, in step 101, the speed of the vehicle body is estimated. This estimation is achieved using outputs of the wheel speed sensors 60. For instance, the second greatest of the wheel speeds or a maximum wheel speed may be determined as the vehicle body speed using the known algorithm. In a case where a longitudinal acceleration sensor is installed in the vehicle, the vehicle body speed may be determined by integrating the longitudinal acceleration acting on the vehicle body. Alternatively, the vehicle body speed may be determined using a sensor capable of measuring an absolute speed of the vehicle body. This embodiment estimates the vehicle body speed according to a sub-program shown in FIG. 5.

After the vehicle body speed is estimated, the routine proceeds to step 110 wherein the longitudinal acceleration acting on the vehicle body is estimated. This estimation may be achieved by using outputs of the wheel speed sensors 60 or alternatively using an output of the longitudinal acceleration sensor.

Figure 5:
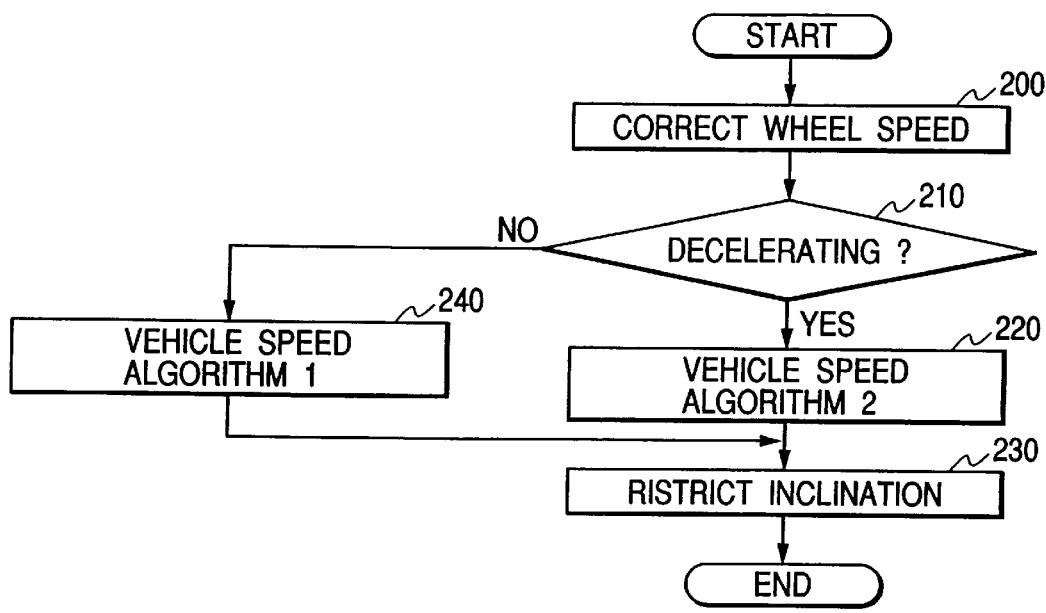
FIG. 5 is a flowchart of a sub-program executed in step 101 of FIG. 4 to estimate the speed of a vehicle body.

Referring to FIG. 5, in step 200, the speed of each wheel is corrected. Specifically, an output of each of the wheel speed sensors 60 is corrected based on the position of the center of gravity of the vehicle body according to one of equations below.

$$VW_{FR}forVX = VW_{FR} - Lf \times YR \qquad (1)$$

$$VW_{FL}forVX = VW_{FL} - Lf \times YR \qquad (2)$$

$$VW_{RR}forVX = VW_{RR} - Lr \times YR \qquad (3)$$

$$VW_{RL}forVX = VW_{RL} - Lr \times YR \qquad (4)$$

where $VW_{FR}forVX$, $VW_{FL}forVX$, $VW_{RR}forVX$, and $VW_{RL}forVX$ are corrected speeds of the front right, front left, rear right, and rear left wheels, respectively, $VW_{FR}$, $VW_{FL}$, $VW_{RR}$, and $VW_{RL}$ are speeds of the front right, front left, rear right, and rear left wheels as determined by outputs of the wheel speed sensors 60, respectively, Lf is the shortest distance between the center of gravity of the vehicle and a front axle, Lr is the shortest distance between the center of gravity of the vehicle and a rear axle, and YR is the yaw rate. In a case where the lateral acceleration sensor 50 is designed to measure the lateral acceleration acting on the vehicle body and not the yaw rate, the yaw rate YR may be given by an equation below.

$$YR = GY/V(n-1) \qquad (5)$$

where GY is the lateral acceleration, n is the number of operations (i.e., program/execution cycles), and V(n−1) is the speed of the vehicle body estimated one program execution cycle earlier. The speed of the vehicle body V(n) estimated in this program execution cycle will be referred to as VX below. When the vehicle is traveling at an extremely low speed (e.g., less than 5 km/s that is a lower critical value of resolution of the wheel speed sensors 60), a constant value (e.g., 5 km/s) is substituted into V(n−1).

The routine proceeds to step 210 wherein it is determined whether the vehicle is decelerating or not. The positive answer is obtained if at least one of four conditions below is encountered. The first is that the value of longitudinal acceleration acting on the vehicle body determined by an output of the sensor 50 or estimated mathematically is negative. The second is that a stop lamp switch (not shown) is turned on, which indicates that the brake pedal 1 is substantially pressed by the vehicle operator. The third is that an IDL (idle) switch is turned on. The fourth is that the master cylinder pressure indicated by an output of the M/C pressure sensor 70 is higher than a preselected value which produces a braking effort.

If a YES answer is obtained in step 210 meaning that the vehicle is now decelerating, then the routine proceeds to step 220 wherein the speed of the vehicle body is estimated according to the second algorithm. Alternatively, if a NO answer is obtained in step 210, then the routine proceeds to step 240 wherein the speed of the vehicle body is estimated according to the first algorithm. In the first algorithm, the smallest of speeds of the four wheels is determined as the speed of the vehicle body. In the second algorithm, the greatest of speeds of the four wheels is determined as the speed of the vehicle body. The reason that the first and second algorithms are used selectively depending upon the deceleration of the vehicle is because when the vehicle is decelerating, it may send any of the wheels into brake-caused skids so that the speeds of the skidding wheels become much smaller than the speed of the vehicle body, and conversely, when the vehicle is not decelerating, but accelerating, it may send any of the wheels into acceleration-caused skids so that the speeds of the skidding wheels become much greater than the speed of the vehicle body.

After step 220 or 240, the routine proceeds to step 230 wherein the rate of change in estimated vehicle body speed is limited. Specifically, a change of the estimated vehicle body speeds between a previous program execution cycle and this program execution cycle is restricted depending upon the longitudinal acceleration acting on the vehicle body.

Figure 6:
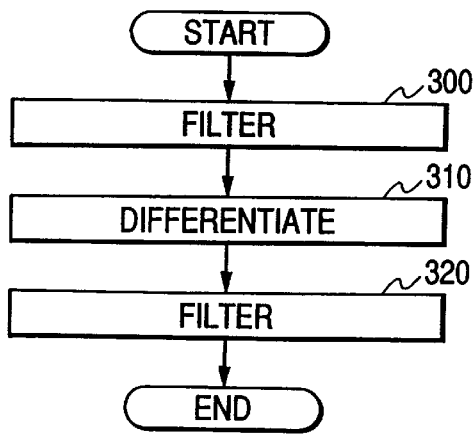
FIG. 6 is a flowchart of a sub-program executed in step 110 of FIG. 4 to estimate the longitudinal acceleration acting on a vehicle body.

FIG. 6 shows a sub-program executed in step 110 of FIG. 4 to estimate the longitudinal acceleration acting on the vehicle body.

In step 300, the vehicle body speed estimated in a manner as discussed in FIG. 5 is filtered using, for example, a low-pass filter to remove noise components higher in frequency than 10 Hz.

In step 310, the vehicle body speed filtered in step 300 is differentiated to determine a vehicle body deceleration (i.e., the longitudinal acceleration).

In step 320, the vehicle body deceleration derived in step 310 is filtered using, for example, a low-pass filter to remove noise components higher than 2 Hz. Note that the vehicle body deceleration has a positive value during deceleration of the vehicle, while it has a negative value during acceleration of the vehicle.

FIG. 7 shows a sub-program executed in step 30 of FIG. 3 to determine the wheel state variables.

In step 400, an output of each of the wheel speed sensors 60, i.e., a wheel speed signal is filtered using a low-pass filter to remove noise components higher than 5 Hz which are caused by irregularities of a road surface.

In step 410, a specified one(s) of the wheel speed signals filtered in step 400 is corrected. If there is a wheel whose diameter is much smaller than any other wheels such as a temper tire-mounted wheel or a wheel whose tire inflation pressure is extremely lowered, the speed of that wheel is corrected to compensate for a difference in diameter between that wheel and the other wheels. This speed correction will be discussed later in detail with reference to FIG. 8. The detection of a wheel whose tire inflation pressure is lowered may be accomplished by analyzing resonant frequency components contained in the wheel speed signals outputted from the wheel speed sensors 60 based on the fact that a drop in tire inflation pressure will cause a resonant frequency of a tire to be lowered. Specifically, resonant frequency components contained in outputs of the wheel speed sensors 60 are compared to determine whether one of the resonant frequency components is lower than the others. If one of the resonant frequency components is lower than the others, the wheel producing the lowered resonant frequency component is identified as a wheel whose tire inflation pressure is much lower than that of the other wheels. The detection of a temper-tire mounted wheel may be accomplished by determining one of the wheels greater in speed than any other wheels when the vehicle is traveling straight without any wheel slippage as the temper-tire mounted wheel.

In steps 420 and 430, front and rear wheel state variables are determined based on speed differences between the front right and left wheels and between the rear right and left wheels, respectively. When all the wheels are not subjected to any skid (i.e., when the slip ratio has a value before the coefficient of adhesion $\mu$ between tire and road surface reaches the peak in the $\mu$-S characteristics), the front and rear wheel state variables correspond to lateral accelerations acting on a front wheel side and a rear wheel side of the vehicle body, respectively. When at least one of the wheels undergoes a skid, the front and rear wheel state variables correspond to limits of the adhesion coefficients on the front and rear wheel sides of the vehicle body, respectively. The determination of the front and rear wheel state variables will be discussed later in detail with reference to FIG. 9.

Figure 8:
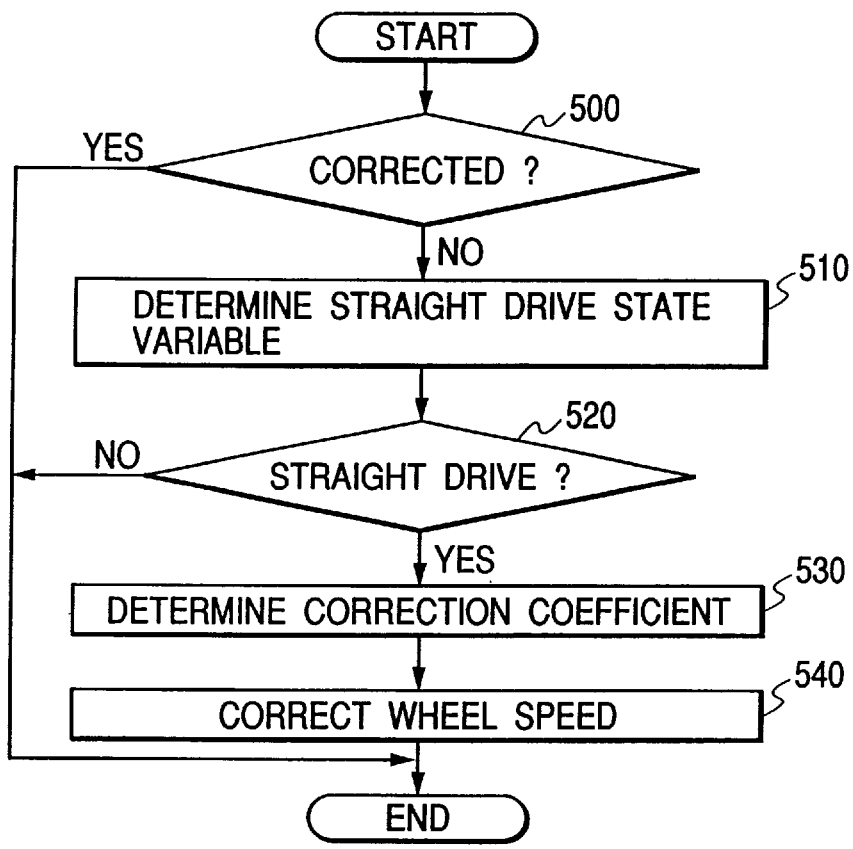
FIG. 8 is a flowchart of a sub-program executed in step 400 of FIG. 7 to correct the wheel speed.

The correction of the speed of each wheel performed in step 410 of FIG. 7 will be discussed with reference to FIG. 8.

In step 500, it is determined whether the wheel speed signal outputted from each of the wheel speed sensors 60 has been corrected or not. If a YES answer is obtained, then the routine terminates. Alternatively, if a NO answer is obtained, then the routine proceeds to step 510 wherein a straight drive state variable is determined by the following relation.

$$\max (VW^{}) - \min (VW^{}) \qquad (6)$$

where  indicates each wheel, max ($VW^{}$) is the greatest one of the speeds of all the wheels, and the min ($VW^{**}$) is the smallest one of the speeds of all the wheels.

The routine proceeds to step 520 wherein it is determined whether the straight drive state variable derived in step 510 is less than a reference value kv (e.g., 2 km/s) or not. Specifically, it is determined whether the speeds of all the wheels fall within a constant range or not. If a NO answer is obtained (max ($VW^{}$)−min ($VW^{}$)≧kv) meaning that the vehicle is not traveling straight, then the routine terminates. Alternatively, if a YES answer is obtained, then the routine proceeds to step 530 wherein a correction coefficient $C^{**}$ is determined by the following equation.

$$C^{}=(VW_{FR}+VW_{FL}+VW_{RR}+VW_{RL})/(4\times VW^{}) \qquad (7)$$

If one of the wheels whose diameter is determined in step 410 of FIG. 7 to be smaller than any other wheels is the front right wheel FR, then $C^{}$=CFR, and $VW^{}$=VWFR.

The routine proceeds to step 540 wherein the speed of the small-diameter wheel is corrected by multiplying it by the correction coefficient $C^{**}$.

Figure 9:
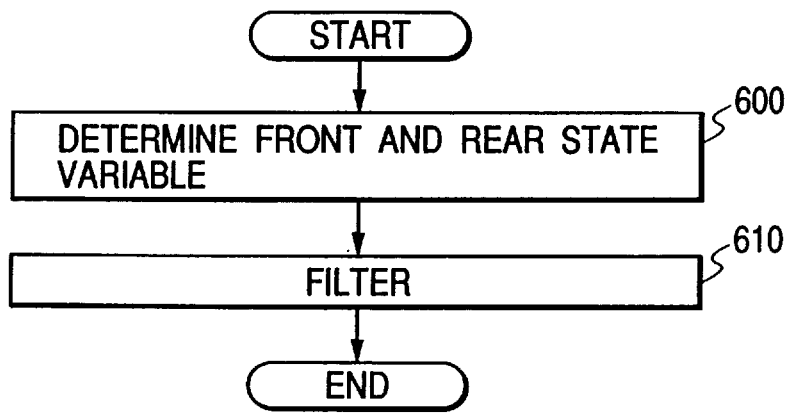
FIG. 9 is a flowchart of a sub-program executed in steps 420 and 430 of FIG. 7 to determine front and rear wheel state variables.

FIG. 9 shows a sub-program executed in steps 420 and 430 of FIG. 7 to determine the front and rear wheel state variables.

In step 600, the front wheel state variable stateW1 is determined in terms of a speed difference between the front right and left wheels according to the equation (8) below.

$$\text{state}W1 = (VWFRC - VWFLC) \times VX / TR \qquad (8)$$

$$= [(VWFRC)^2 - (VWFLC)^2]/(2 \times TR)$$

where TR is the tread width, the term (VWFRC−VWFLC)/TR) indicates the yaw rate on a front side of the vehicle body, and $VW^{**}C$ indicates the speed of each wheel after the correction in step 410 of FIG. 7.

Similarly, the rear wheel state variable stateW2 is determined in terms of a speed difference between the rear right and left wheels according to the equation (9) below.

$$\text{state}W2 = (VWRRC - VWRLC) \times VX / TR \qquad (9)$$

$$= [(VWRRC)^2 - (VWRLC)^2]/(2 \times TR)$$

where the term (VWRRC−VWRLC)/TR) indicates the yaw rate on a rear side of the vehicle body.

The sub-program executed in step 40 of FIG. 3 to determine the vehicle state will be described below with reference to FIG. 10.

In step 700, the direction of a turn of the vehicle is determined in at least one of five manners, as discussed below.

The first is to determine the direction of a turn based on the polarity of an output of the lateral acceleration sensor 50. For instance, the lateral acceleration sensor 50 is so designed that the output thereof has a positive polarity when the vehicle turns left, while it has a negative polarity when the vehicle turns right. Thus, if the output of the lateral acceleration sensor 50 has a positive value, then it is determined that the vehicle is turning left. The second is to determine the direction of a turn using a yaw rate sensor. The third is to determine the direction of a turn using a steering sensor designed to measure the angle and direction of rotation of a steering shaft accompanied by manual rotation of a steering wheel of the vehicle. The fourth is to determine the direction of a turn based on whether the front wheel state variable stateW1 shows a positive value or a negative value. The fifth is to determine the direction of a turn based on whether the rear wheel state variable stateW2 shows a positive value or a negative value. If either of the front and rear wheel state variables stateW1 and stateW2 shows a positive value, it is determined that the vehicle is turning left. Conversely, if either of the front and rear wheel state variables stateW1 and the stateW2 shows a negative value, it is determined that the vehicle is turning right.

In step 710, it is determined whether the vehicle state determined one program execution cycle earlier is unstable or not. In the first program execution cycle immediately after the ignition switch is turned on, it is determined that the vehicle state is stable. If a YES answer is obtained, then the routine proceeds to step 720 to determine a vehicle stability, which will be described later in detail with reference to FIG. 15. Alternatively, if a NO answer is obtained, then the routine proceeds to step 730 to determine a vehicle instability, as will be discussed below.

Figure 11:
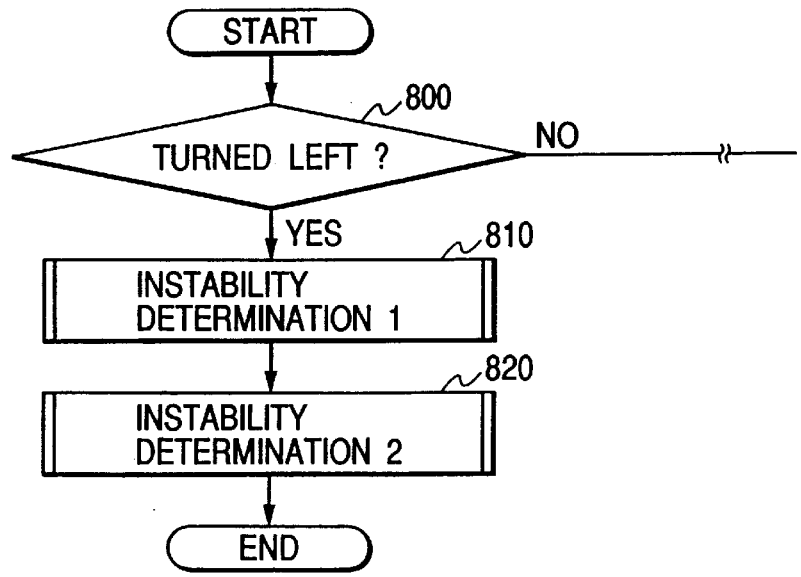
FIG. 11 is a flowchart of a sub-program executed in step 730 of FIG. 10 to determine instability of behavior of a vehicle body

After entering step 730, the routine proceeds to step 800 in FIG. 11 wherein it is determined whether the vehicle is turning to the left or not. If a YES answer is obtained, then the routine proceeds to step 810. Alternatively, if a NO answer is obtained meaning that the vehicle is turning to the right, control similar to that when the vehicle is turning to the left is performed, and explanation thereof in detail will be omitted here.

In step 810, an instability determination 1 is made, as will be discussed in detail with reference to FIG. 12. The instability of the whole of the vehicle body is determined using a state variable derived based on the wheel speed and a state variable derived based on an output of the lateral acceleration sensor 50.

Figure 13:
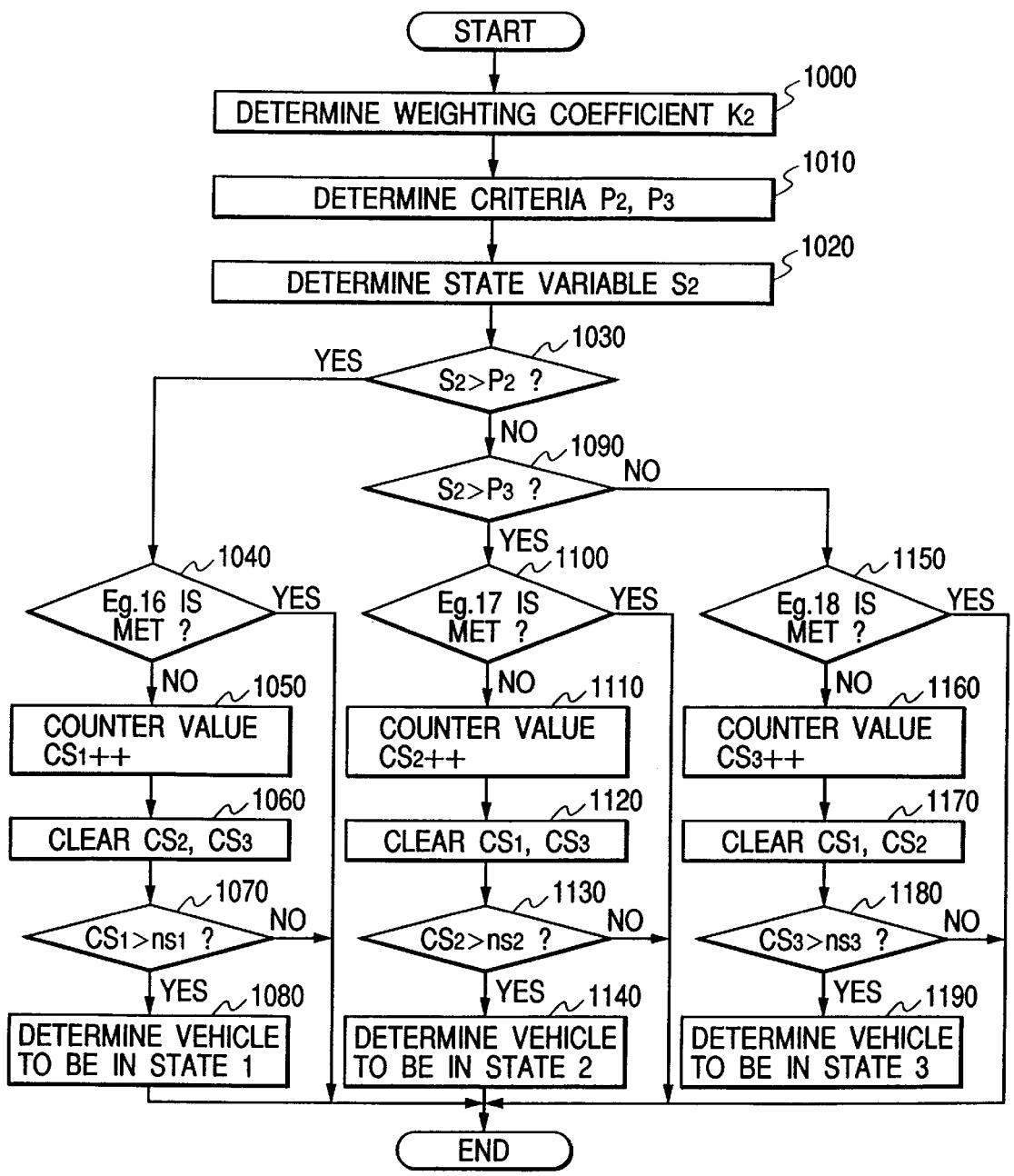
FIG. 13 is a flowchart of a sub-program executed in step 820 of FIG. 11 to determine the type of instability of behavior of a vehicle body.

In step 820, an instability determination 2 is made, as will be discussed in detail with reference to FIG. 13, to specify an unstable part of the vehicle body.

The instability determination 1 will be discussed below with reference to FIG. 12.

In step 900, a front state variable 1 is determined. The front state variable 1 is expressed in state 1 in the equation (10) below and calculated based on the front wheel state variable stateW1 and a vehicle state variable stateV1 derived by an output of a sensor which is installed directly on the vehicle body to measure behavior of the vehicle body (i.e., the lateral acceleration sensor 50).

$$\text{state1} = \text{stateW1} - \text{stateV1} \tag{10}$$

In step 910, a rear state variable 2 (=state2) is determined according to the equation (11) below.

$$\text{state2} = \text{stateW2} - \text{stateV2} \tag{11}$$

Here, stateV1 and stateV2 are $$\text{stateV1} = \text{stateV2} = GY \tag{12}$$

The front state variable state1 is a variable indicative of stability of a front portion of the vehicle body around the front right and left wheels. The rear state variable state2 is a variable indicative of stability of a rear portion of the vehicle body around the rear right and left wheels. The front and rear state variables state1 and state2 take smaller values when the stability is increased, while they take greater values when the instability is increased.

In step 920, a weighting coefficient K1 used in a following step 940 is determined. The weighting coefficient k1 may be a constant value (K1=0.5) or changed within a range from 0 to 1.0 with a vehicle state such as understeer or oversteer or a state of a steering wheel. The weighting coefficient K1 is, as can be seen from the equation (13) below, a value for determining which of the front state variable state1 (i.e., the degree of stability of the front portion of the vehicle body) and the rear state variable state2 (i.e., the degree of stability of the rear portion of the vehicle body) is to be weighted in determination of a state parameter S1, as will be described later, for determining the instability of the vehicle. Thus, if K1 =0.5, the front state variable state1 and the rear state variable state2 are weighted equally.

The weighting coefficient K1 may alternatively be determined depending upon the acceleration or deceleration of the vehicle. For instance, in a case of a front engine front drive vehicle, the front wheels (i.e., driven wheels) are subjected to acceleration during acceleration of the vehicle. The weighting coefficient K1 is thus decreased (e.g., K1=0.2). During deceleration of the vehicle, the weight of the vehicle is shifted forward, thus causing the rear wheels (i.e., compliance wheels) to be locked more easily than the front wheels. The weighting coefficient K1 is thus increased (e.g., K1=0.8) to decrease the weight of the rear state variable state2. Specifically, the weighting coefficient K1 may be changed depending upon which of the front and rear wheels are driven wheels.

In step 930, the criterion P1 is determined. The criterion P1 may be a constant value (e.g., P1=2) or changed within a range of positive values with the state of the vehicle, steering, or braking. For instance, when the brake pedal 1 is depressed or when the baking effort of the engine is applied to the wheels, a difference in speed between the wheels tends to occur, which may result in an error of the control. In order to avoid this problem, the criterion P1 may be increased during braking. The criterion P1 may alternatively be changed with the coefficient of adhesion $\mu$ between tire and road surface. The coefficient of road-tire adhesion $\mu$ may be determined in a known manner or alternatively using an output of the lateral acceleration sensor 50. In a case where the output of the lateral acceleration sensor 50 is used, the criterion P1 is decreased as the lateral acceleration acting on the vehicle body is decreased and the coefficient of road-tire adhesion $\mu$ is decreased. This is because a difference in speed between the wheels will be decreased as the coefficient of road-tire adhesion $\mu$ is decreased, so that a range within in which the vehicle behavior is stable becomes narrower. The reason that the lateral acceleration acting on the vehicle body may be used in determining the coefficient of road-tire adhesion $\mu$ is because the lateral acceleration acting on the vehicle body bears a one-to-one correspondence to the lateral acceleration acting on each wheel until limits of the coefficients of road-tire adhesion $\mu$ of all the wheels are reached, so that the state parameter S1, as will be discussed later, is hardly increased up to the criterion P1 until at least one of the limits of the coefficients of road-tire adhesion $\mu$ is reached, however, if at least one of the wheels exceeds the limit of the coefficient of road-tire adhesion $\mu$ thereof, it will cause a difference between lateral accelerations acting on the vehicle body and that wheel to be developed, therefore, the lateral acceleration acting on the vehicle body (=the lateral acceleration acting on the wheels) at this time corresponds to the coefficient of road-tire adhesion $\mu$.

In step 940, the state parameter S1 is determined according to the equation (13) below.

$$S1 = K1 \times \text{state1} + (1-K1) \times \text{state2} \tag{13}$$

Specifically, the state parameter S1 is determined in terms of the front and rear state variables state1 and state2 derived based on the wheel state variables and the vehicle state variables in steps 900 and 910. The instability of the whole of the vehicle body or vehicle behavior may be determined accurately by adding the instability of the front portion of the vehicle body and the instability of the rear portion of the vehicle body.

In step 950, it is determined whether the state parameter S1 is greater than the criterion P1 or not. If a YES answer is obtained, then the routine proceeds to step 960 wherein an instability counter value n is incremented. Alternatively, if a NO answer is obtained, then the routine proceeds to step 970 wherein the instability counter value n is cleared In step 980, it is determined whether the instability counter value n is greater than a reference value n1 or not. If a YES answer is obtained, then the routine proceeds to step 990 wherein it is determined that the vehicle is in an unstable state as a whole. The reference value n1 may be changed with the state of braking of the vehicle and/or the coefficient of road-tire adhesion $\mu$. Specifically, the reference value n1 is increased as the criterion P1 is decreased, while it is decreased as the criterion P1 is increased. For instance, when the coefficient of road-tire adhesion $\mu$ is small, and the criterion P1 is also small, an increase in reference value n1 will cause a period of time until the routine proceeds to step 990 and determines the instability of the vehicle in step 990 to be prolonged, thereby avoiding an error in determination of the instability which would arise from the decrease of the criterion P1. It is advisable that the period of time until the determination of the instability of the vehicle be prolonged ten times or more.

The instability determination 2 made in step 820 of FIG. 11 to specify an unstable part of the vehicle body will be discussed below with reference to FIG. 13. Note that in an initial state following turning on of the ignition switch, it is determined that the vehicle is in a state 2, as will be discussed later.

In step 1000, a weighting coefficient K2 is determined. The weighting coefficient K2 may be a constant value within a range from 0 to 1.0 (e.g., K2=0.5 or changed over the range from 0 to 1.0. The weighting coefficient K2 may be determined in a manner similar to that used in determining the weighting coefficient K1 and may also be set equal to the weighting coefficient K1.

In step 1010, criteria P2 and P3 are determined. The criterion P2 is determined to be greater than zero (0), while the criterion P3 is determined to be smaller than zero (0). The criteria P2 and P3 may be determined in a manner similar to that used in determining the criterion P1.

In step 1020, a state parameter S2 is calculated according to the equation (14) below.

$$S2 = K1 \text{ state1} - (1-K1) \text{ state2} \tag{14}$$

The state parameter S2 is a parameter indicating which of the front and rear portions of the vehicle body is in a more unstable state. For instance, when the state parameter S2 has a positive value, the front portion of the vehicle body is more unstable than the rear portion, while when the state parameter S2 has a negative value, the rear portion of the vehicle body is more unstable than the front portion.

In step 1030, it is determined whether the state parameter S2 is greater than the criterion P2 or not. If a YES answer is obtained meaning that the front portion of the vehicle body is unstable more than a reference measure of instability, then the routine proceeds to step 1040. Alternatively, if a NO answer is obtained, then the routine proceeds to step 1090 wherein it is determined whether the state parameter S2 is greater than the criterion P3 or not. If a YES answer is obtained meaning that the rear portion of the vehicle body is unstable more than the reference measure of instability, then the routine proceeds to step 1100. Alternatively, if a NO answer is obtained, then the routine proceeds to step 1150.

Figure 14:
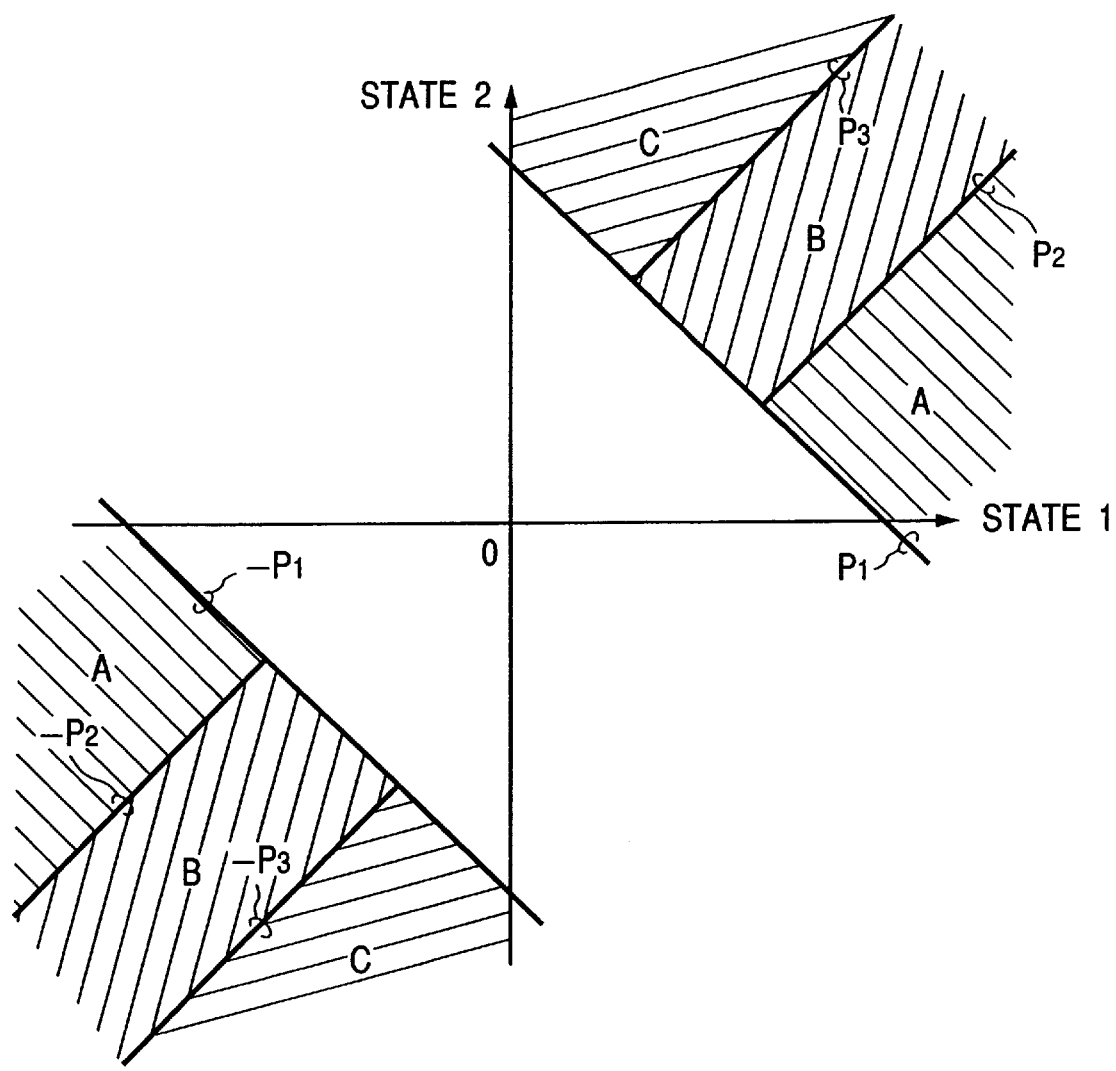
FIG. 14 is an illustration which shows the types of instability of behavior of a vehicle body determined in terms of front and rear state variables.

Steps 1040, 1100, and 1150 each specify a type of instability of the vehicle using a coordinate system, as shown in FIG. 14, defined by the front and rear state variables state1 and state2.

In FIG. 14, zones A, B, and C are defined by lines P1, -P1, P2, -P2, P3, and -P3. P1, P2, and P3 take values determined in steps 930 and 1010. An overall area consisting of the zones A, B, and C is expressed by the equation (15) below. The zones A, B, and C are expressed by the equations (16), (17), and (18) below, respectively.

$$|K1 \times \text{state1} + (1-K1) \times \text{state2}| > P1 \tag{15}$$

$$K2 \times |\text{state1}| - (1-K2) \times |\text{state2}| > P2 \tag{16}$$

$$P2 > K2 \times |\text{state1}| - (1-K2) \times |\text{state2}| > P3 \tag{17}$$

$$P3 > K2 \times |\text{state1}| - (1-K2) \times |\text{state2}| \tag{18}$$

Figure 12:
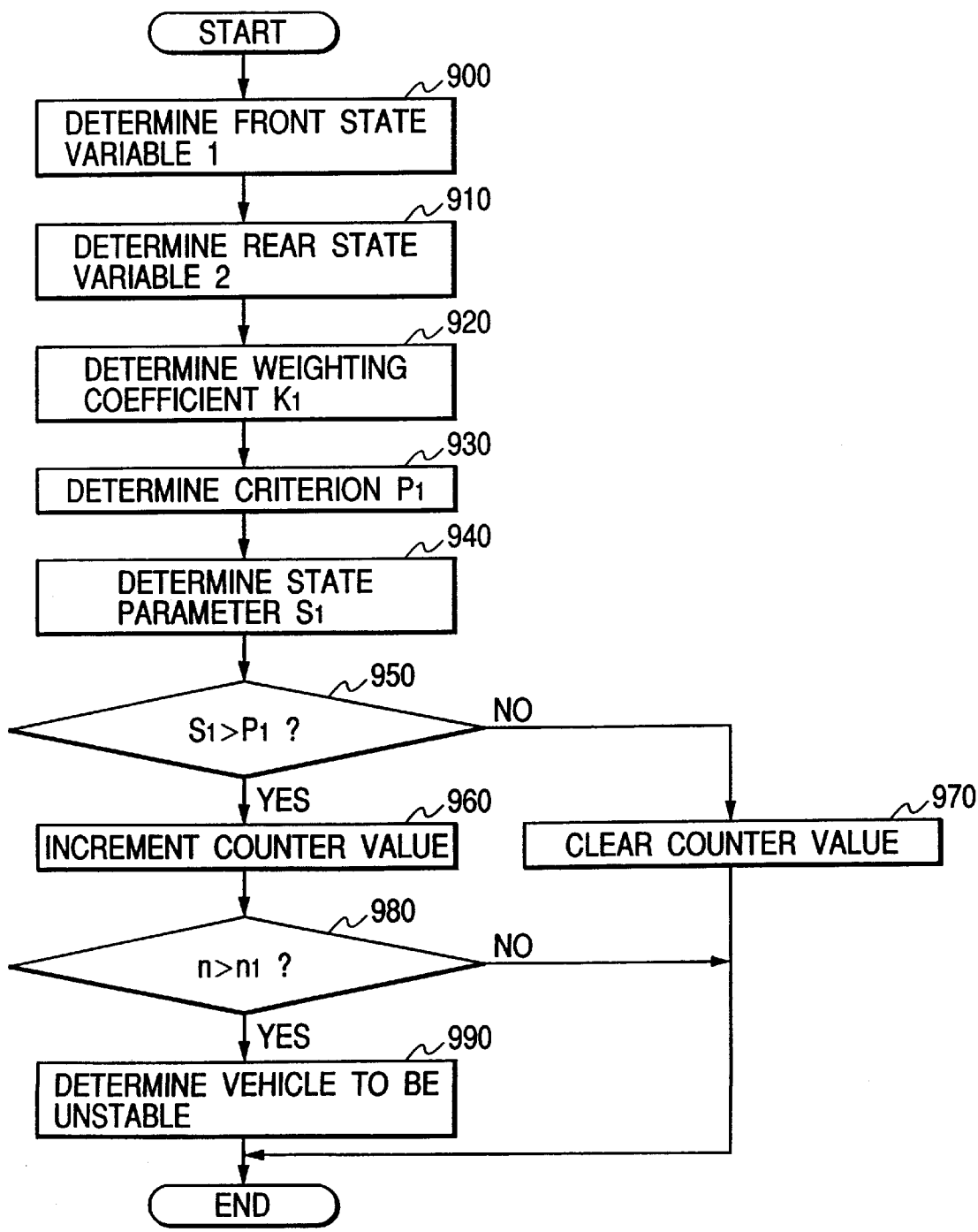
FIG. 12 is a flowchart of a sub-program executed in step 810 of FIG. 11 to calculate front and rear state variables for determining instability of behavior of a vehicle body.

The overall area defined by the equation (15) is an area within which the vehicle is in the unstable state as a whole, as discussed in step 990 of FIG. 12. This instability of the vehicle is further classified into three states (i.e., the zones A, B, and C) defined by the equations (16), (17), and (18). The zone A given by the equation (16) is an area within which the coefficient of road-tire adhesion of the front wheels reaches a limiting value thereof so that the front portion of the vehicle body is unstable. The zone B is an area within which the coefficients of road-tire adhesion of the front and rear wheels reach the limiting value. The zone C is an area within which the coefficient of road-tire adhesion of the rear wheels reaches the limiting value so that the rear portion of the vehicle body is unstable.

In step 1040, it is determined whether the equation (16) is met or not. If a YES answer is obtained, then the routine terminates. Alternatively, if a NO answer is obtained meaning that the vehicle lies in the zone A, then the routine proceeds to step 1050 wherein a counter value CS1 is incremented. The routine proceeds to step 1060 wherein counter values CS2 and CS3 are cleared. The routine proceeds to step 1070 wherein it is determined whether the counter value CS1 is greater than a reference value ns1 or not. The counter value CS1 indicates the length of time the vehicle falls in the zone A. If a YES answer is obtained, then the routine proceeds to step 1080 wherein it is determined that the vehicle falls within the zone A over a reference duration (i.e., the reference value ns1) and that the vehicle is in the state 1 where the instability of the vehicle results from the fact that the front wheels have reached the limit of the coefficient of road-tire adhesion $\mu$.

In step 1100, it is determined whether the equation (18) is met or not. If a YES answer is obtained, then the routine terminates. Alternatively, if a NO answer is obtained meaning that the vehicle lies in the zone C, then the routine proceeds to step 1110 wherein the counter value CS2 is incremented. The routine proceeds to step 1120 wherein the counter values CS1 and CS3 are cleared. The routine proceeds to step 1130 wherein it is determined whether the counter value CS2 is greater than a reference value ns2 or not. The counter value CS2 indicates the length of time the vehicle falls in the zone C. If a YES answer is obtained in step 1130, then the routine proceeds to step 1140 wherein it is determined that the vehicle falls within the zone C over a reference duration (i.e., the reference value ns2) and that the vehicle is in the state 2 where the instability of the vehicle results from the fact that the rear wheels have reached the limit of the coefficient of road-tire adhesion $\mu$.

In step 1150, it is determined whether the equation (17) is met or not. If a YES answer is obtained, then the routine terminates. Alternatively, if a NO answer is obtained meaning that the vehicle lies in the zone B, then the routine proceeds to step 1160 wherein the counter value CS3 is incremented. The routine proceeds to step 1170 wherein the counter values CS1 and CS2 are cleared. The routine proceeds to step 1180 wherein it is determined whether the counter value CS3 is greater than a reference value ns3 or not. The counter value CS3 indicates the length of time the vehicle falls in the zone B. If a YES answer is obtained in step 1180, then the routine proceeds to step 1190 wherein it is determined that the vehicle falls within the zone B over a reference duration (i.e., the reference value ns3) and that the vehicle is in the state 3 where the instability of the vehicle results from the fact that the front and rear wheels have reached the limit of the coefficient of road-tire adhesion $\mu$.

The reference values ns1, ns2, and ns3 may be changed in a manner similar to that used in determining the reference value n1.

Figure 15:
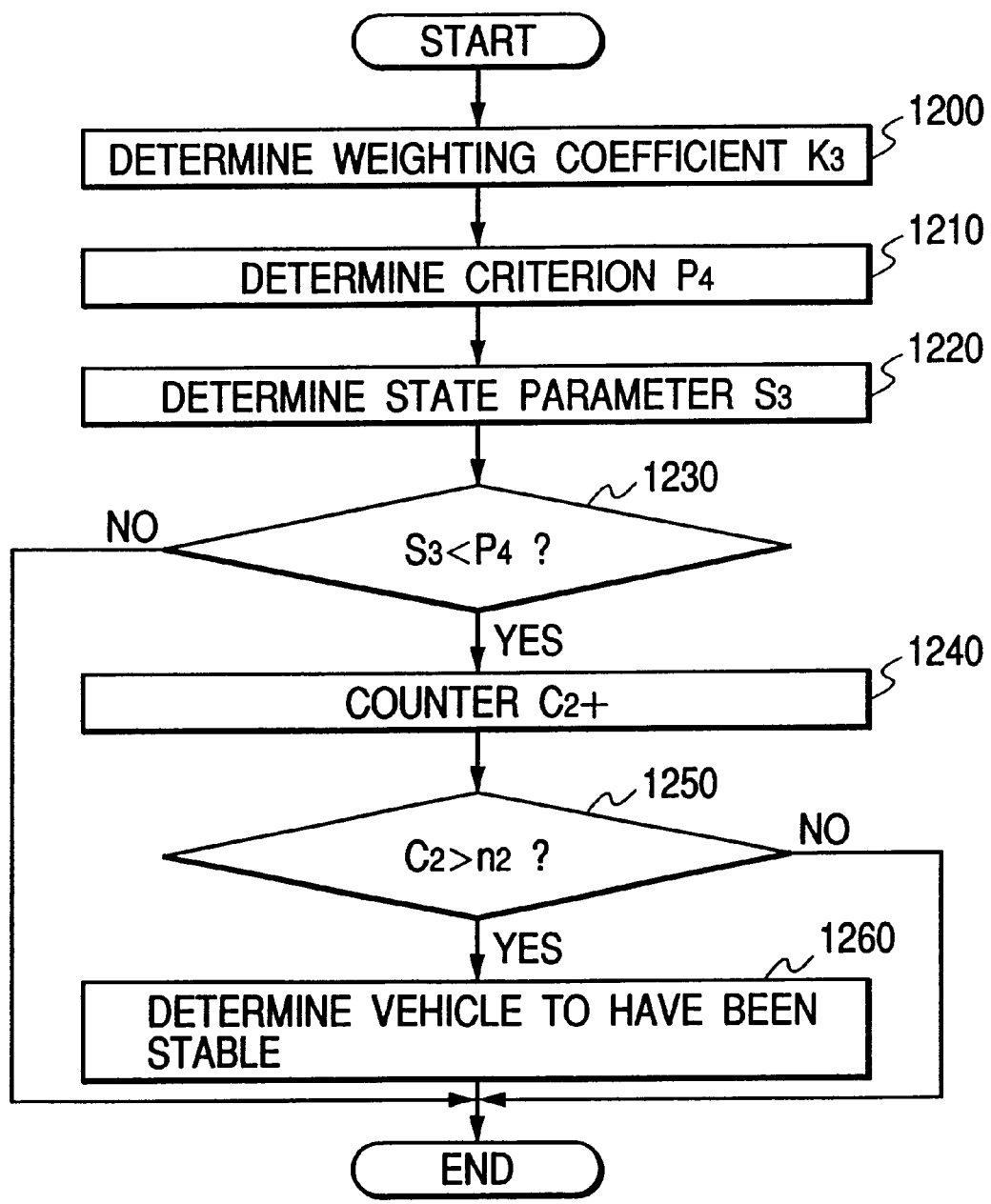
FIG. 15 is a flowchart of a sub-program executed in step 720 of FIG. 10 to determine stability of behavior of a vehicle body.

FIG. 15 shows a sub-program executed in step 720 of FIG. 10 to determine the vehicle stability.

In step 1200, a weighting coefficient K3 ($0 \leq K3 \leq 1$) is determined. The weighting coefficient K3 may be equal to the weighting coefficient K2, as described above, or determined in a manner similar to that used in determining the weighting coefficient K1.

In step 1210, a criterion P4 is determined which is used in a following step 1230. The criterion P4 is determined to be smaller than the criterion P1 used in determining the instability of the vehicle as a whole in FIG. 12 and may be changed with the state of steering and/or braking in the same manner as used in determining the criterion P1.

In step 1220, a state parameter S3 is calculated according to the equation (19) below.

$$S3 = K3 \text{state}1 + (1-K3)\text{state}2 \qquad (19)$$

The state parameter S3 is set equal to the state parameter S1 if the weighting coefficient K3 is identical with the weighting coefficient K2.

In step 1230, it is determined whether the state parameter S3 is smaller than the criterion P4 or not. The criterion P4 is, as described above, smaller than the criterion P1 used in FIG. 12. Step 1230, thus, determines whether the current instability of behavior of the vehicle is lower than the limiting value of instability of the vehicle at which the vehicle behavior control should be performed or not. If a NO answer is obtained in step 1230, then the routine terminates. Alternatively, if a YES answer is obtained, then the routine proceeds to step 1240 wherein a counter value C2 is incremented. The routine proceeds to step 1250 wherein it is determined whether the counter value C2 is greater than a reference value n2 or not. The counter value C2 indicates the length of time the vehicle is in a stable state after returning from the unstable state. If a YES answer is obtained meaning that the duration of stability of the vehicle exceeds the reference value n2, then the routine proceeds to step 1260 wherein it is determined that the behavior of the vehicle has become stable completely, and the valves in the hydraulic system are deactivated, as will be discussed later in detail.

The reference value n2 may be changed with the value of the criterion P4 in the same manner as used in determining the reference value n1. The execution of step 1250 in which the counter value C2 is compared with the reference value n2 prior to step 1260 forces the control of behavior of the vehicle to continue to be performed for a constant period of time even if the speeds of the wheels are changed by the behavior control of the vehicle or application of brakes to the wheels, and it becomes difficult to determine the state of the vehicle accurately, thereby avoiding the hunting of the control, in other words, preventing the behavior control of the vehicle from being terminated immediately after the brake is applied to at least one of the wheels, resulting in a rapid increase in difference in speed between the wheels.

The behavior control of the vehicle or control of the valves in the hydraulic system shown in FIG. 1 which is performed in steps 50 and 60 of FIG. 3 will be discussed with reference to FIGS. 16 to 24.

FIG. 16 shows a brake control program executed in step 50 to determine the controlled variable for each wheel (i.e., the wheel cylinder pressure applied as the braking effort to each wheel).

Figure 18:
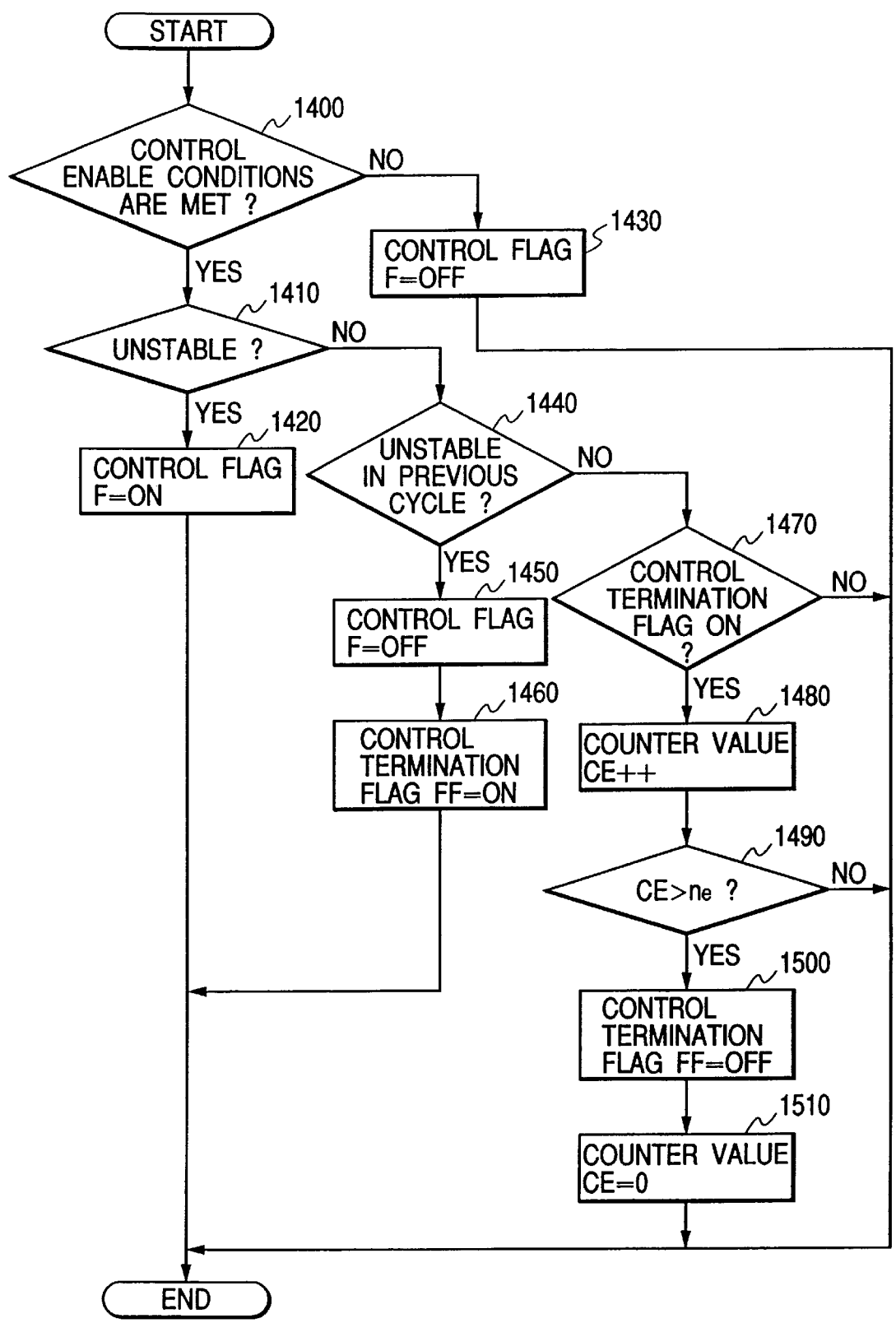
FIG. 18 is a flowchart of a sub-program executed in step 1300 of FIG. 16 to provide control and control termination flags.

In step 1300, a control flag, as will be described later in FIG. 18, is set.

Figure 17:
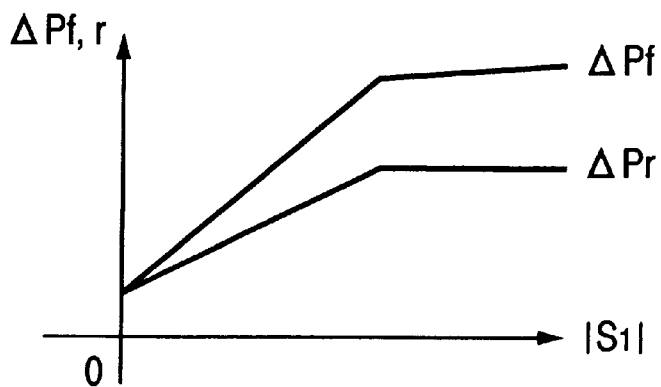
FIG. 17 is a graph which shows the relation between a state parameter and basic controlled variables.

In step 1310, basic controlled variables $\Delta$Pf and $\Delta$Pr are determined. The basic controlled variables $\Delta$Pf and $\Delta$Pr indicate basic hydraulic pressures produced for the front wheel cylinders 4 and 5 and the rear wheel cylinders 34 and 35, respectively, and are determined as a function of an absolute value of the state parameter S1 by look-up using a map, as shown in FIG. 17.

In step 1320, correction coefficients Kf and Kr for the basic controlled variables $\Delta$Pf and $\Delta$Pr are determined in a manner, as will be discussed later in FIGS. 19 and 20.

In step 1330, the controlled variables, as will be described in detail with reference to FIG. 21, are determined which indicate the wheel cylinder pressures applied to the front and rear wheel cylinders 4, 5, 34, and 35, respectively.

The setting of the control flag in step 1300 will be described below with reference to FIG. 18.

In step 1400, it is determined whether a control enable condition is satisfied or not. For example, it is determined whether the sensors (i.e., the lateral acceleration sensor 50, the wheel speed sensors 60, and the M/C pressure sensor 70) and the actuators (i.e., the front differential pressure control valve 6, the control valves 14, and 15, the pressure elevation control valves 7 and 8, the pressure reduction control valves 11 and 12, etc.) operate normally or not. If a YES answer is obtained meaning that the sensors and the actuators are not malfunctioning, then the routine proceeds to step 1410. Alternatively, if a NO answer is obtained, then the routine proceeds to step 1430 wherein a control flag F is turned off.

In step 1410, it is determined whether the vehicle is in an unstable state or not based on results of determination in steps 710 to 730 of FIG. 10. If a NO answer is obtained, then the routine proceeds to step 1440 wherein it is determined whether the vehicle was determined to be unstable one program cycle earlier or not. If a YES answer is obtained, then the routine proceeds to step 1450 wherein the control flag F is turned off. The routine proceeds to step 1460 wherein a control termination flag FF is turned on.

If a NO answer is obtained in step 1440, then the routine proceeds to step 1470 wherein it is determined whether the control termination flag FF is turned on or not. If a NO answer is obtained, then the routine terminates. Alternatively, if a YES answer is obtained, then the routine proceeds to step 1480 wherein a counter value CE is incremented. The routine proceeds to step 1490 wherein it is determined whether the counter value CE is greater than a reference value ne or not. If a NO answer is obtained, then the routine terminates. Alternatively, if a YES answer is obtained, then the routine proceeds to step 1500 wherein the control termination flag FF is turned off. The routine proceeds to step 1510 wherein the counter value CE is cleared.

As can be seen from FIG. 18, at the end of the control, that is, when the vehicle behavior has become stable, the control termination flag FF is turned on. At this time, the wheel cylinder pressure of each of the wheel cylinders 4, 5, 34, and 35 is regulated gradually or stepwise using pulse signals so as to agree with the master cylinder pressure. Specifically, in a terminal phase of the control, the master cylinder pressure measured by the M/C pressure sensor 70 is compared with the wheel cylinder pressure estimated by the controlled hydraulic pressure or the state of the valves in the hydraulic system. When the master cylinder pressure is greater than the wheel cylinder pressure, the wheel cylinder pressure is increased gradually at a given rate, while when the master cylinder pressure is smaller than the wheel cylinder pressure, the wheel cylinder pressure is decreased gradually at the given rate to bring the wheel cylinder pressure into agreement with the master cylinder pressure. The control, thus, continues to be performed for a period of time without being stopped instantaneously even when the vehicle has become stable, thereby avoiding the turbulence of behavior of the vehicle at the end of the control.

Figure 19:
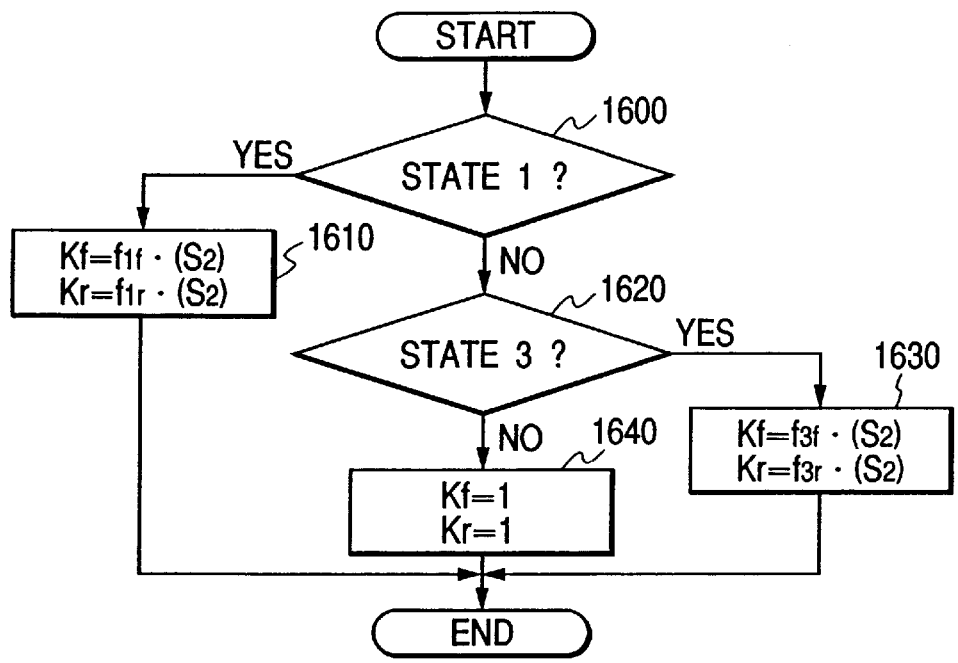
FIG. 19 is a flowchart of a sub-program executed in step 1320 of FIG. 16 to determine correction coefficients for basic controlled variables.
Figure 20:
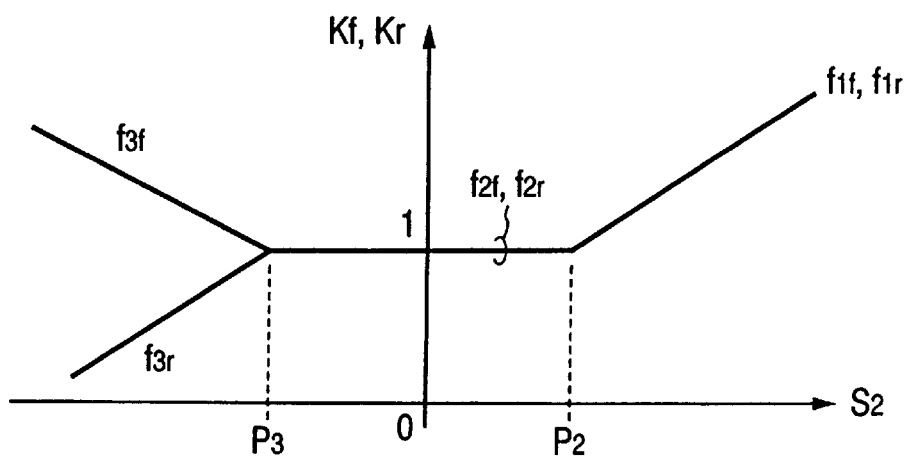
FIG. 20 is a graph which shows the relation between correction coefficients and a state parameter.

FIG. 19 shows a sub-program executed in step 1320 of FIG. 16 to determine the correction coefficients Kf and Kr for the basic controlled variables $\Delta Pf$ and $\Delta Pr$.

In step 1600, it is determined whether the vehicle is determined to be in the state 1 in step 1080 or not. If a YES answer is obtained, then the routine proceeds to step 1610 wherein the correction coefficients Kf and Kr are set to f1f(S2) and f1r(S2) as a function of the state parameter S2, respectively, by look-up using a map, as shown in FIG. 20.

If a NO answer is obtained in step 1600, then the routine proceeds to step 1620 wherein it is determined that the vehicle is determined to be in the state 1 in step 1190 or not. If a YES answer is obtained, then the routine proceeds to step 1630 wherein the correction coefficients Kf and Kr are set to f3f(S2) and f3r(S2) as a function of the state parameter S2, respectively, by look-up using the map, as shown in FIG. 20. Alternatively, if a NO answer is obtained, then the routine proceeds to step 1640 wherein the correction coefficients Kf and Kr are set to f2f=1 and f2r=1 (i.e., Kf=Kr= f2f=f2r=1).

FIG. 21 shows a sub-program executed in step 1330 to determine the controlled variables for the front and rear wheel cylinders 4, 5, 34, and 35.

In step 1700, it is determined whether the control flag F is turned on or not. If a YES answer is obtained, then the routine proceeds to step 1710 wherein it is determined whether the vehicle is turning to the left or not. If a YES answer is obtained, then the routine proceeds to step 1720 wherein a coefficient Kc is set to one (1). Alternatively, if a NO answer is obtained, then the routine proceeds to step 1730 wherein the coefficient Kc is set to minus one (−1).

In step 1740, the controlled variables $\Delta P_{FR}$, $\Delta P_{FL}$, $\Delta P_{RR}$, and $\Delta P_{RL}$ indicating controlled changes in wheel cylinder pressure of the wheel cylinders 4, 5, 34, and 35 for the front right, front left, rear right, and rear left wheels are determined according to the equations (20) to (23) below.

$$\Delta P_{FR} = Kc \times Kf \times \Delta Pf \quad (20)$$

$$\Delta P_{FL} = -Kc \times Kf \times \Delta Pf \quad (21)$$

$$\Delta P_{RR} = Kc \times Kr \times \Delta Pr \quad (22)$$

$$\Delta P_{RL} = -Kc \times Kr \times \Delta Pr \quad (23)$$

In step 1750, a control pattern for each wheel is determined using a corresponding one of the controlled variables $\Delta P_{FR}$, $\Delta P_{FL}$, $\Delta P_{RR}$, and $\Delta P_{RL}$, respectively, which will be described later with reference to FIG. 22.

If a NO answer is obtained in step 1700, then the routine proceeds to step 1760 wherein it is determined whether the control termination flag FF is turned on or not. If a NO answer is obtained, then the routine terminates. Alternatively, if a YES answer is obtained, then the routine proceeds to step 1770 wherein a control pattern for each wheel, i.e., the wheel cylinder pressure applied to each of the wheel cylinders 4, 5, 34, and 35 at the end of the control is determined in the manner as described above.

Referring to FIG. 22, in step 1800, a target hydraulic pressure Pt for each of the wheel cylinders 4, 5, 34, and 35 is determined according to the equation (24) below.

$$Pt^{} = Pmc + \Delta P^{} \quad (24)$$

where Pmc indicates the master cylinder pressure which may be determined using an output of the M/C pressure sensor 70 or estimated mathematically, and $\Delta P^{**}$ indicates the controlled variable for each wheel determined by one of the above equations (20) to (23).

In step 1810, the wheel cylinder pressure $Pe^{**}$ of each of the wheel cylinders 4, 5, 34, and 35 is determined. This determination may be made using outputs of pressure sensors (not shown) installed in the hydraulic lines near the wheel cylinders 4, 5, 34, and 35 (e.g., in a case of the wheel cylinder 4, a portion of the branch line A1 between the pressure elevation control valve 7 and the wheel cylinder 4) or alternatively by look-up using maps in terms of a solenoid-energizing signal output pattern and hydraulic output characteristics of the pressure elevation control valves 7, 8, 37, and 38 and the pressure reduction control valves 11, 12, 41, and 42.

In step 1820, a hydraulic control parameter $R^{**}$ is determined according to the equation (25) below which is used under the PID-control in determining whether the wheel cylinder pressure for each wheel.

$$R^{} = PID(Pt^{}, Pe^{**}) \quad (25)$$

In step 1830, an inclination of the hydraulic control parameter $R^{**}$ is restricted to control a change in wheel cylinder pressure.

Figure 23:
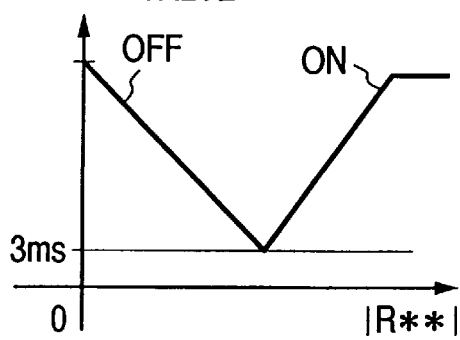
FIG. 23 is a time chart which shows activation of pressure elevation valves under control of vehicle behavior.
Figure 24:
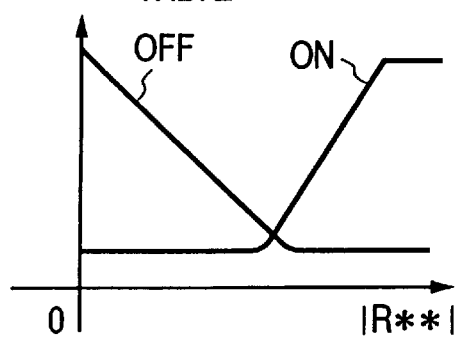
FIG. 24 is a time chart which shows activation of pressure reduction valves under control of vehicle behavior.

In step 1840, a control signal output pattern (i.e., an energized pattern of a solenoid) for each of the pressure elevation control valve 7, 8, 37, and 38 and the pressure reduction control valves 11, 12, 41, and 42 is determined using maps, as shown in FIGS. 23 and 24.

The operation of the vehicle behavior control apparatus will be discussed below with reference to FIGS. 25 to 29.

Figure 25:
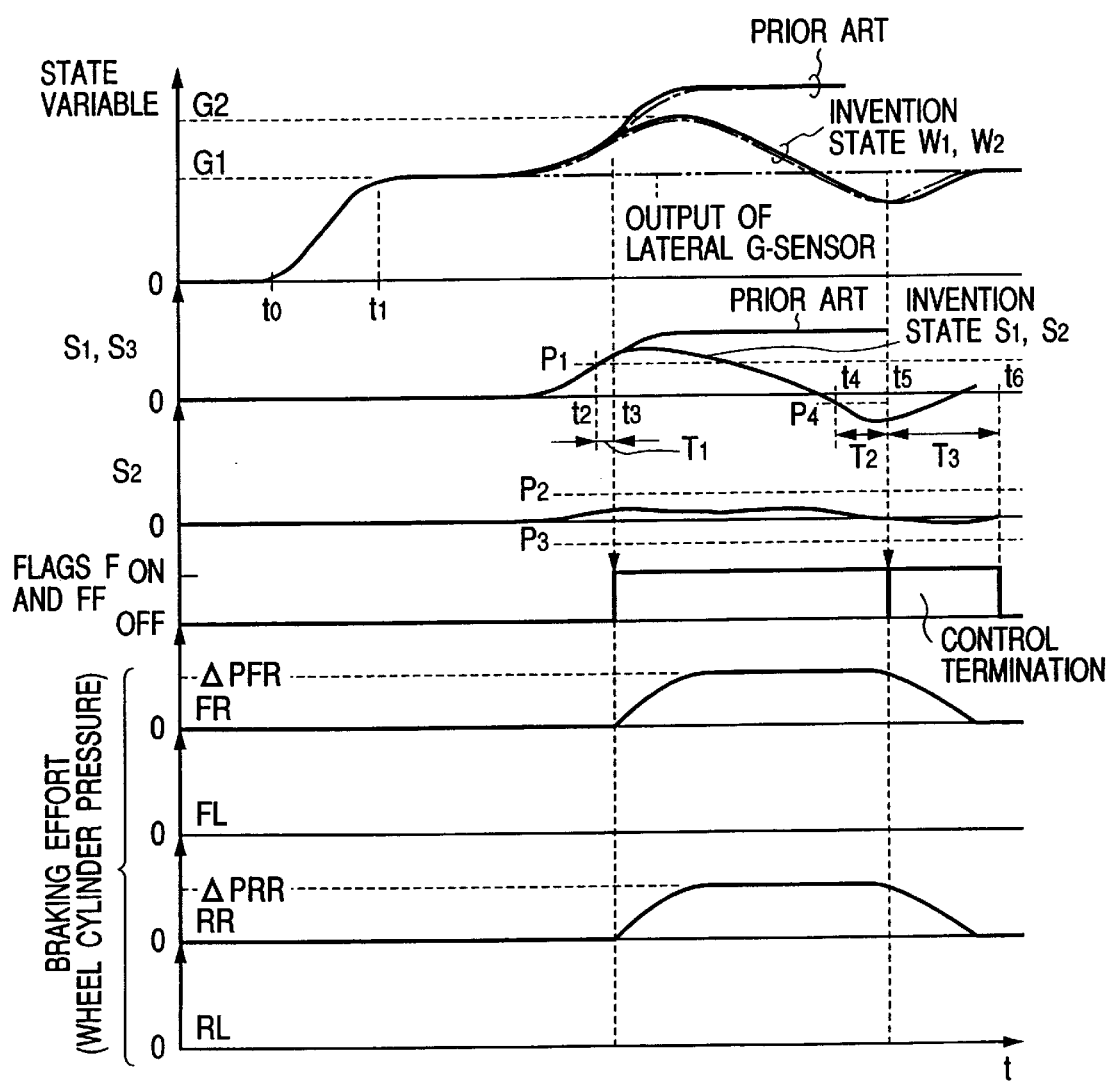
FIG. 25 is a time chart which shows the wheel cylinder pressure for each wheel regulated based on a state variable of a vehicle body when the tack-in takes place and state parameters S1 to S3 during turning to the left and during no braking.

FIG. 25 shows the wheel cylinder pressure for each wheel regulated based on the state variable of the vehicle body (i.e., the lateral acceleration acting on the vehicle body) when the tack-in takes place and the state parameters S1 to S3 during turning to the left and during no braking.

Assume that the vehicle starts to turn to the left at time t0, and the lateral acceleration acting on the vehicle body reaches G1 at time t1 and then is kept constant.

When the state parameter S1 exceeds the criterion P1 at time t2, after a lapse of a time interval T1 (=n1×$\Delta T$ where n1 is the reference value used in step 980 of the instability determination 1, and $\Delta T$ is one execution cycle of the vehicle behavior control program) between t2 and t3, the control flag F is turned on. Upon turning on of the control flag F, the wheel cylinder pressures $\Delta P_{FR}$=Kf×$\Delta Pf$ and $\Delta P_{RR}$=Kr×$\Delta Pr$ are applied to the wheel cylinders 4 and 34 for the front right wheel FR and the rear right wheel RR. These braking efforts applied to the front right and rear right wheels FR and RR cause the wheel state variables stateW1 and stateW2, as indicated by solid and broken lines in FIG. 25 respectively, to be decreased after reaching G2. At time t4, the state parameter S1 becomes smaller than the criterion P4. At time t5 after a lapse of time T2, the control flag F is turned off. The time T2 is given by a relation of T2=n2×$\Delta T$ where n2 is the reference value used in step 1250 of FIG. 15. At the same time as the control flag F is turned off, the control termination flag FF is turned on and kept on for a period of time T3 until time t6. The period of time T3 is given by T3=ne×$\Delta T$ where ne is the reference value used in step 1490 of FIG. 18.

Figure 26:
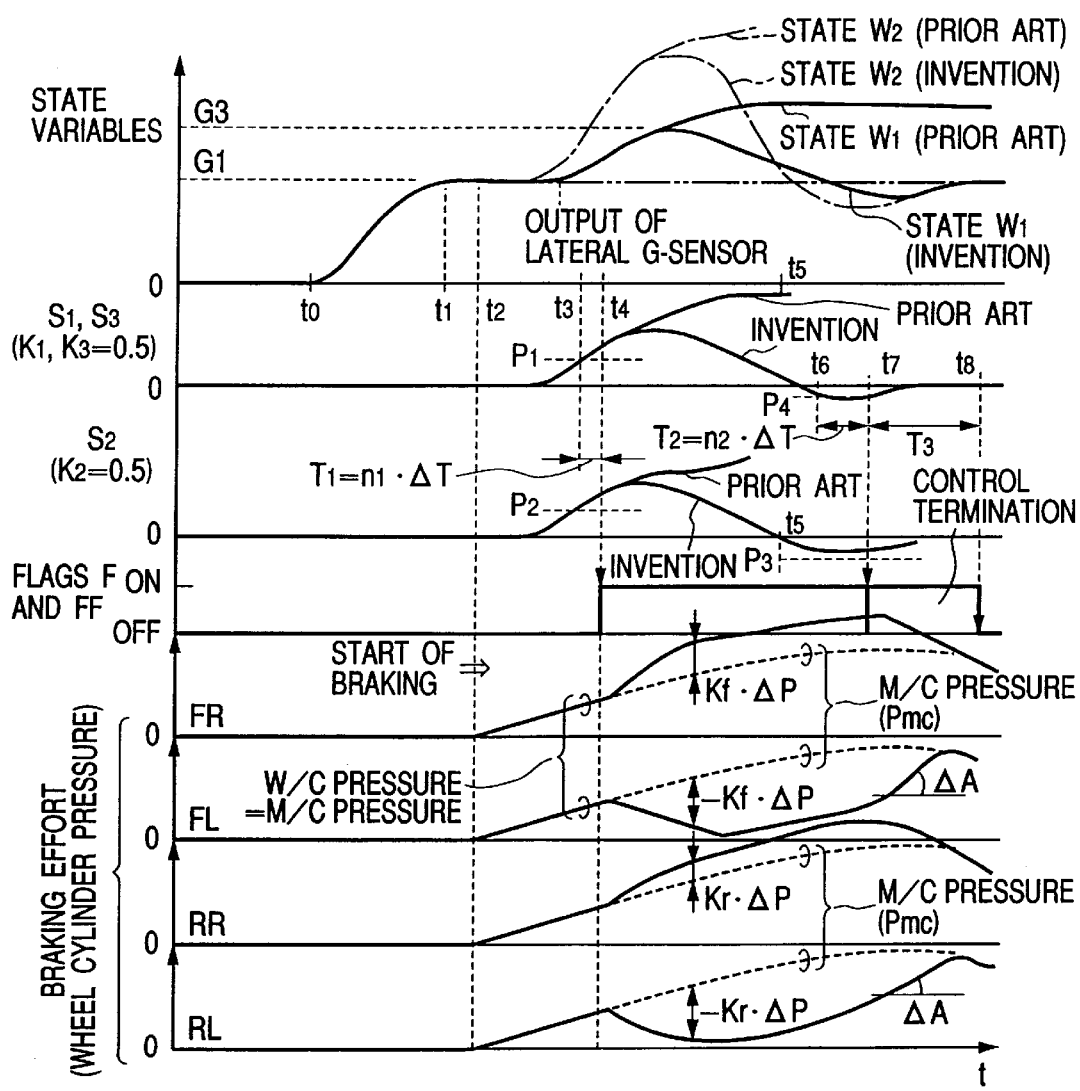
FIG. 26 is a time chart which shows the wheel cylinder pressure for each wheel regulated based on a state variable of a vehicle body and state parameters S1 to S3 during turning to the left and during braking.

FIG. 26 shows the wheel cylinder pressure for each wheel regulated based on the state variable of the vehicle body (i.e., the lateral acceleration acting on the vehicle body) and the state parameters S1 to S3 during turning to the left and during braking.

Assume that the vehicle starts to turn to the left at time t0, the lateral acceleration acting on the vehicle body reaches G1 at time t1 and then is kept constant, and the vehicle operator starts to depress the brake pedal 1 at time t2 so that the master cylinder pressure Pmc rises to elevate the wheel cylinder pressure in each of the wheel cylinders 4, 5, 34, and 35.

When the state parameter S1 exceeds the criterion P1 at time t3, after a lapse of the time interval T1 ($=n1 \times \Delta T$) between time t3 and the time t4, the control flag F is turned on. Upon turning on of the control flag F, the wheel cylinder pressures $\Delta P_{FR}$ and $\Delta P_{RR}$ applied to the wheel cylinders 4 and 34 for the front right wheel FR and the rear right wheel RR are increased by amounts ($=Kf \times \Delta Pf$ and $Kr \times \Delta Pr$), respectively. At the same time, the wheel cylinder pressures $\Delta P_{FR}$ and $\Delta P_{RR}$ applied to the wheel cylinders 5 and 35 for the front left wheel FL and the rear left wheel RL are decreased by amounts ($=Kf \times \Delta Pf$ and $Kr \times \Delta Pr$), respectively. This causes the wheel state variables stateW1 and stateW2, as indicated by solid and broken lines in FIG. 26 respectively, to be decreased gradually. At time t5, the state parameter S2 indicating which of the front and rear portions of the vehicle body is in a more unstable state becomes smaller than zero (0), but is kept above the criterion P3. At time t6, the state parameter S1 indicating the instability of the vehicle becomes smaller than the criterion P4. At time t7 after a lapse of time T2, the control flag F is turned off. The time T2 is given by a relation of $T2=n2 \times \Delta T$ where n2 is the reference value used in step 1250 of FIG. 15. At the same time as the control flag F is turned off, the control termination flag FF is turned on and kept on for a period of time T3 until time t8. The period of time T3 is given by $T3=ne \times \Delta T$ where ne is the reference value used in step 1490 of FIG. 18.

Each wheel cylinder pressure is converged on the master cylinder pressure gradually after time t7. For instance, the wheel cylinder pressures for the front left wheel FL and the rear left wheel RL are increased at a rate $\Delta A$. The rate $\Delta A$ may be changed with a running condition or a road surface condition which would cause the behavior of the vehicle to change. For instance, when the vehicle is steered rapidly or the coefficient of road-tire adhesion $\mu$ is low (e.g., during traveling on a snowy or icy road), the rate $\Delta A$ may be lowered to decrease the rate of pulse-increase or pulse-decrease in wheel cylinder pressure for avoiding rapid change in behavior of the vehicle accompanied by the termination of the control. Additionally, when the state parameter S2 is great or when the lateral acceleration acting on the vehicle body is great, the rate $\Delta A$ may be decreased to decrease the rate of pulse-increase or pulse-decrease in wheel cylinder pressure for avoiding an unwanted change in behavior of the vehicle immediately after the vehicle behavior becomes stable. The rate $\Delta A$ may be changed with the coefficient of road-tire adhesion $\mu$, rapid steering, the state parameter S2 or a combination thereof.

As apparent from the above discussion, the behavior control of the vehicle of this embodiment which takes the effects of critical conditions of the wheels on the behavior of the vehicle into account is achieved by the hydraulic control of brakes using the state parameter S1 indicating the stability and instability of the whole of the vehicle body, the state parameter S2 indicating which of the front and rear portions of the vehicle body is in a more unstable state, and the state parameter S3 indicating the stability of the vehicle body.

Further, a roll of the vehicle body during cornering may be avoided by monitoring lifts of tires of the inside wheels and applying brakes to the outside wheels so as to suppress the lifts of the tires. One example of determination of the lifts of tires will be discussed below.

Usually, the outside wheels are applied with a load of the vehicle body during cornering so that they grip on the road and are stable in speed. The lifting of the inside wheels may, thus, be monitored by estimating the speed of the inside wheels based on the speed of the outside wheels and the lateral acceleration acting on the vehicle body to determine a change in speed of the inside wheels.

In practice, the change in speed of the inside wheels during cornering may be determined using the equations (26) to (28) below.

$$PTr = (VW_{FR} + VW_{RR}) - (VW_{FL} + VW_{RL}) \qquad (26)$$

where PTr is a parameter which indicates a difference in speed between the inside and outside wheels during cornering and which is mathematically determined based on the measured speeds of the wheels.

$$PT = GY \times A/(1 + B \cdot z^{-1}) \qquad (27)$$

where PT is a parameter which indicates a difference in speed between the inside and outside wheels during cornering and which is estimated by the lateral acceleration acting on the vehicle body, A and B are constants, z is a complex variable in the z-transform. The inside-outside wheel speed difference parameter PT is established with a first-order lag of the lateral acceleration in a transfer system. The equation (27), thus, uses a transfer function of the first-order lag.

Thus, if the inside wheels during cornering are the right wheels, the sum of speeds of the inside wheels $V_R (= VW_{FR} + VW_{RR})$ may be expressed below from the equations (26) and (27).

$$V_R = VW_{FR} + VW_{RR} VW_{FL} + VW_{RL} GY \times A/(1 + B \cdot z^{-1}) \qquad (28)$$

If $V_R/2$ is defined as an estimated inside wheel speed, and differences between the speed of the front inside wheel (i.e., the front right wheel) and the estimated inside wheel speed and between the speed of the rear inside wheel (i.e., the rear right wheel) and the estimated inside wheel speed are defined as tire lift parameters $P_{FR}$ and $P_{RR}$ for the front and rear inside wheels (i.e., the front right and rear right wheels), respectively, they are expressed as follows:

$$P_{FR} = |VW_{FR} - V_R/2| \qquad (29)$$

$$P_{RR} = |VW_{RR} - V_R/2| \qquad (30)$$

When either of the tire lift parameters $P_{FR}$ and $P_{RR}$ of the front and rear inside wheels exceeds a threshold value, the brakes applied to the wheels are controlled as described above so as to minimize the amount of lift of the wheel.

Figure 27A:
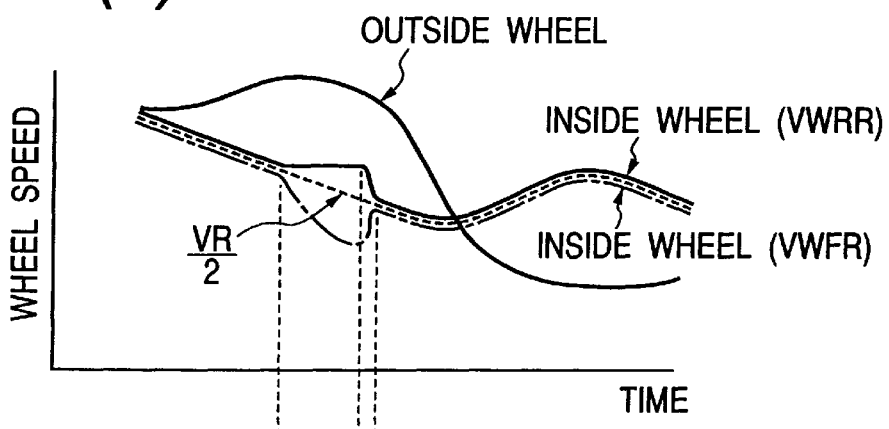
FIG. 27(a) is a time chart which shows changes in speed of outside and inside wheels during cornering of a vehicle.
Figure 27B:
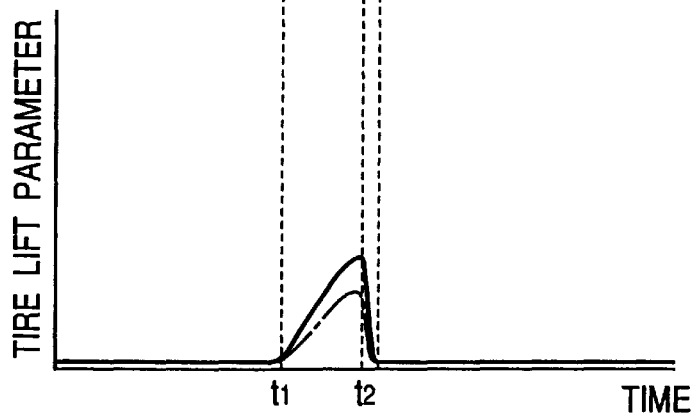
FIG. 27(b) is a time chart which shows a tire lift parameter which changes with a change in wheel speed.

The relation between the speed of a wheel and the tire lift parameter of the wheel is shown in FIGS. 27(a) and 27(b). When any one of the inside wheels is lifted up from the road surface during cornering, that wheel, as indicated by a solid line in FIG. 27(a), hardly experiences a change in wheel speed. At this time, the tire lift parameter, as indicated by a solid line in FIG. 27(b), rises. When the tire lift parameter exceeds a threshold value, the braking effort is applied to either or both of the front and rear outside wheels to control the rolling of the vehicle body. It is advisable that the braking effort greater than that used in controlling the above described instability of behavior of the vehicle body be applied to the outside wheels.

The tire lift parameters PFR and PRR may alternatively be determined using the yaw rate of angular motion applied to the vehicle body. In this case, the inside-outside wheel speed difference parameter PT is also established with a first-order lag of the yaw rate in a transfer system and thus determined taking a transfer function of the first-order lag of the yaw rate into account. The use of the yaw rate in determining the tire lift parameters PFR and PRR offers the following advantage.

Each of the wheel speed sensors 60 is sensitive only to the direction of rotation of the wheel and cannot detect the lateral speed of the wheel in a side slip direction. Specifically, when the vehicle undergoes a side slip, the wheel speed sensors 60 are insensitive to rotational motion of the vehicle body, but a lateral acceleration signal outputted from the lateral acceleration sensor 50 contains a component of the side slip. Therefore, if VR is determined based on a difference between the sum of speeds of the outside wheels measured by the wheel speed sensors 60 and the lateral acceleration measured by the lateral acceleration sensor 50, it will cause the tire lift parameters PFR and PRR to have errors resulting from the side slip. In contrast, the yaw rate sensor is sensitive only to rotational motion (yawing) of the vehicle body, not the side slip, and the rotational motion of the vehicle body causes a difference in speed between the right and left wheels to occur. Outputs of the yaw rate sensor and the wheel speed sensors 60, thus, contain components indicative of the rotational motion of the vehicle body, thereby allowing the tire lift parameters PFR and PRR to be determined without the errors resulting from the side slip.

The control of the brakes applied to the wheels may be performed when it is determined in step 40 of FIG. 3 that the vehicle is in the unstable state and when it is determined that the amount of lift of any of the wheels exceeds the threshold value or alternatively only when the amount of lift of any of the wheels exceeds the threshold value regardless of the determination in step 40.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, the front and rear wheel state variables stateW1 and stateW2 are determined in step 600 of FIG. 9 based on differences in speed between the front right and left wheels and between the rear right and left wheels, respectively, but they may alternatively be determined using differences in speed between the front right and rear left wheels and between the front left and rear right wheels, respectively, according to the equations (31) and (32) below.

$$stateW1 = (VWFRC - VWRLC) \times VX/TR \quad (31)$$

$$stateW2 = (VWRRC - VWFLC) \times VX/TR \quad (32)$$

In this case, the front state variable state1 will be a parameter indicating the state of the vehicle body in a diagonal direction from the front right to the rear left wheel. The rear state variable state2 will be a parameter indicating the state of the vehicle body in a direction from the front left to the rear right wheel.

The lateral acceleration sensor 50 is implemented with the lateral G-sensor measuring the lateral acceleration acting on the vehicle body directly or the yaw rate sensor measuring the yaw rate of angular motion applied to the vehicle body, but the vehicle behavior control apparatus may be equipped with both the lateral G-sensor and the yaw rate sensor. In this case, the parameters stateV1 and stateV2 used in the equations (10) and (11) may be expressed as follows:

$$stateV1 = GY + Lf \times \delta yr \quad (33)$$

$$stateV2 = GY - Lr \times \delta yr \quad (34)$$

where Lf and Lr indicate distances between the center of gravity of the vehicle body and the front axle and between the center of gravity of the vehicle body and the rear axle, respectively, and δyr is a differentiated value of the yaw rate.

The determination of instability using the state variables state1 and state2 calculated based on the above parameters stateV1 and stateV2 further increase the accuracy of the vehicle behavior control.

The behavior control apparatus of this invention may be used with a front drive vehicle equipped with two hydraulic lines: one extending from the front right wheel to the rear left wheel and the second extending from the front left wheel to the rear right wheel. In this case, the wheel cylinder 5 shown in FIG. 1 is provided for the rear left wheel RL, and the wheel cylinder 35 is provided for the front left wheel FL.

Actuators other than the brakes may also be controlled using the equations (26) to (30) and the tire lift parameters PFR and PRR. As one example of the actuators, vehicle occupant restraint devices such as an airbag for a vehicle operator or a front passenger or side airbags may be activated based on the tire lift parameters PFR and PRR. In this case, a transient status of the vehicle roll may be estimated using the determination of the tire lift. Specifically, when the tire lift is detected, it may be determined that there is a high possibility that the vehicle turns sideways to deploy the airbags.

Figure 28:
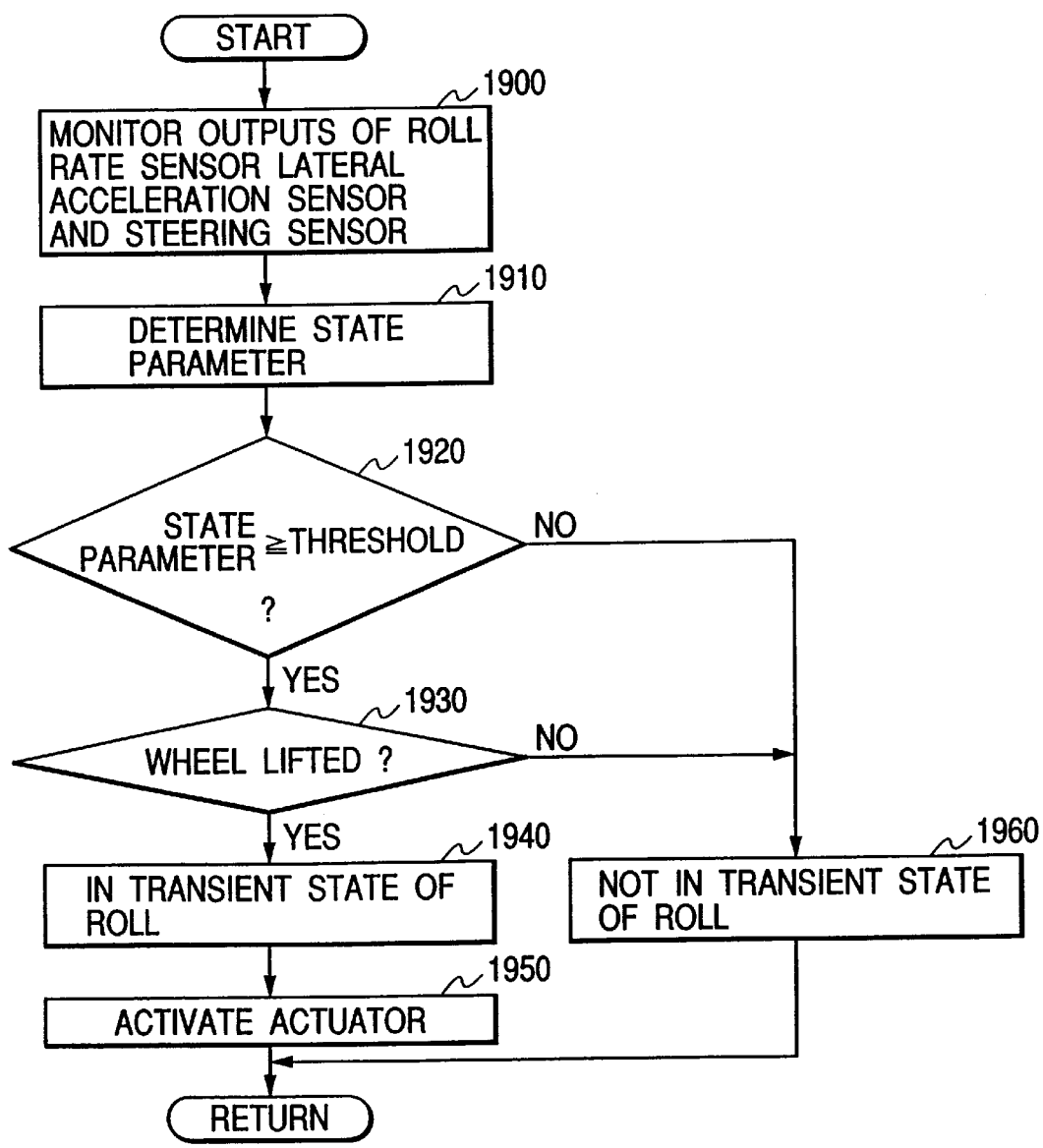
FIG. 28 is a flowchart of a program to activate airbags using tire lift parameters.

FIG. 28 shows one example of such airbag control.

First, in step 1900, outputs of a roll rate sensor, the lateral acceleration sensor 50, and a steering sensor are monitored. The steering sensor can be of a known type designed to measure the angle of rotation of the steering shaft (i.e., the steering wheel). The roll rate sensor can also be of a known type installed in the vicinity of the center of gravity of the vehicle.

In step 1910, at least one state parameter is determined using at least one of the sensor outputs monitored in step 1900. For example, the roll rate of the vehicle is determined as the state parameter using the output of the roll rate sensor. Alternatively, the lateral acceleration (or the yaw rate) of the vehicle body may be determined as the state parameter using the output of the lateral acceleration sensor 50. The roll rate and the lateral acceleration (or the yaw rate) may alternatively be estimated using the vehicle speed (or the wheel speeds) and a steered angle of the steering wheel.

In step 1920, it is determined whether the state parameter is greater than or equal to a threshold value or not. If a NO answer is obtained, then the routine proceeds to step 1960 wherein the vehicle is not in the transient state of the roll. Alternatively, if a YES answer is obtained in step 1920, then the routine proceeds to step 1930 wherein the tire lift parameters PFR and PRR are determined in the same manner as described above and wherein it is determined whether each of the tire lift parameters PFR and PRR exceeds a threshold value or not. If at last one of the tire lift parameters PFR and PRR is smaller than the threshold value meaning that at least one of the front and rear inside wheels during cornering of the vehicle is in contact with the road surface, then the routine proceeds to step 1960. Alternatively, if a NO answer is obtained in step 1930 meaning that the front and rear inside wheels are both lifted away from the road surface, then the routine proceeds to step 1940 wherein the vehicle is in the transient state of the roll. The routine proceeds to step 1950 wherein the airbags are deployed. Additionally, in step 1950, the brakes may also be applied to at least the front wheels to increase the slip ratio, resulting in a decrease in side force, which will cause the reactive force from the road surface acting on the outside wheels about which the vehicle rolls to be decreased for preventing the vehicle from turning sideways. When the vehicle operator is pressing the brake pedal 1, the brake pressure which is higher than the master cylinder pressure produced by the pedal effort may be applied to one of the front and rear wheels that is not lifted away from the road surface.

In step 1930, an additional determination may also be made as to whether the length of time between t1 and t2 in FIG. 27(*b*) either of the tire lift parameters P$_{FR}$ and P$_{RR}$ is greater than the threshold value (e.g., zero) exceeds a given interval or not. In this case, if YES answers to the two determinations are obtained in step 1930, then the routine proceeds to step 1940.

What is claimed is:

1. A vehicle behavior control apparatus comprising:

a wheel speed sensor measuring speeds of wheels;

a plurality of brake actuators producing braking efforts applied to wheels of a vehicle;

a lateral momentum determining circuit determining a lateral momentum of a vehicle body during traveling;

a vehicle state estimating circuit estimating a state of behavior of the vehicle body based on the speeds of the wheels measured by said wheel speed sensor and the lateral momentum determined by said lateral momentum determining circuit;

a target braking effort determining circuit determining a target braking effort to be produced by each of said brake actuators based on the state of behavior of the vehicle estimated by said vehicle state estimating circuit; and braking effort regulating means for regulating the braking efforts produced by said brake actuators so as to agree with target braking efforts, respectively, to control behavior of the vehicle body, wherein said vehicle state estimating circuit includes wheel state variable determining means for determining a wheel state variable based on a difference in speeds between a right one of the wheels and a left one of the wheels and estimates the state of behavior of the vehicle body based on the wheel state variable.

2. A vehicle behavior control apparatus as set forth in claim 1, wherein the wheels of the vehicle consists of a pair of front right and left wheels and a pair of rear right and left wheels, and wherein said vehicle state estimating circuit includes wheel state variable determining means for determining a front wheel state variable based on a difference in speed between the front right and left wheels and a rear wheel state variable based on a difference in speed between the rear right and left wheels and estimates the state of behavior of the vehicle body based on the front and rear wheel state variables.

3. A vehicle behavior control apparatus as set forth in claim 1, wherein the wheels of the vehicle consists of a pair of front right and left wheels and a pair of rear right and left wheels, and wherein said vehicle state estimating circuit includes wheel state variable determining means for determining a first diagonal wheel state variable indicative of stability in a diagonal direction of the vehicle body from the front right wheel to the rear left wheel based on a difference in speed between the front right wheel and the rear left wheel and a second diagonal wheel state variable indicative of stability in a diagonal direction of the vehicle body from the front left wheel to the rear right wheel based on a difference in speed between the front left and rear right wheels, said wheel state determining means estimating the state of behavior of the vehicle body based on the first and second diagonal wheel state variables.

4. A vehicle behavior control apparatus as set forth in claim 2, wherein said vehicle state estimating circuit estimates the state of behavior of the vehicle body based on a front state variable and a rear state variable, the front state variable indicating stability of a front portion of the vehicle body and being determined based on a difference between the lateral momentum and the front wheel state variable, the rear state variable indicating stability of a rear portion of the vehicle body and being determined based on a difference between the lateral momentum and the rear wheel state variable.

5. A vehicle behavior control apparatus as set forth in claim 1, wherein said vehicle state estimating circuit estimates the state of behavior of the vehicle body based on a first state variable and a second state variable, the first state variable indicating stability of a first diagonal portion of the vehicle body and being determined based on a difference between the lateral momentum and the first diagonal wheel state variable, the second state variable indicating stability of a second diagonal portion of the vehicle body and being determined based on a difference between the lateral momentum and the second diagonal wheel state variable.

6. A vehicle behavior control apparatus as set forth in claim 2, wherein said vehicle state estimating circuit determines a first state parameter indicating instability of the whole of the vehicle body based on the sum of the front and rear state variables and uses the first state parameter in estimating the state of behavior of the vehicle body.

7. A vehicle behavior control apparatus as set forth in claim 1, wherein said vehicle state estimating circuit determines a first state parameter indicating instability of the whole of the vehicle body based on the sum of the first and second state variables and uses the first state parameter in estimating the state of behavior of the vehicle body.

8. A vehicle behavior control apparatus as set forth in claim 4, wherein said vehicle state estimating circuit determines a second state parameter indicating a location of a portion of the vehicle body which is unstable in behavior of the vehicle body based on a difference between the front and rear state variables and uses the second state parameter in estimating the state of behavior of the vehicle body.

9. A vehicle behavior control apparatus as set forth in claim 1, wherein said vehicle state estimating circuit determines a second state parameter indicating a location of a portion of the vehicle body which is unstable in behavior of the vehicle body based on a difference between the first and second state variables and uses the second state parameter in estimating the state of behavior of the vehicle body.

10. A vehicle behavior control apparatus as set forth in claim 8, wherein said vehicle state estimating circuit determines which of the wheels whose road-tire adhesion reaches a limit based on a value of the second state parameter.

11. A vehicle behavior control apparatus as set forth in claim 1, wherein said vehicle state estimating circuit determines which of the wheels whose road-tire adhesion reaches a limit based on a value of the second state parameter.

12. A vehicle behavior control apparatus as set forth in claim 4, wherein said vehicle state estimating circuit determines a first state parameter indicating instability of the whole of the vehicle body and a second state parameter indicating a location of a portion of the vehicle body which is unstable in behavior of the vehicle body, the first state parameter being determined by the sum of the front and rear state variables, the second state parameter being determined by a difference between the front and rear state variables, said vehicle state estimating circuit classifying the state of behavior of the vehicle body into a plurality of different states based on the first and second state parameters.

13. A vehicle behavior control apparatus as set forth in claim 1, wherein said vehicle state estimating circuit determines a first state parameter indicating instability of the whole of the vehicle body and a second state parameter indicating a location of a portion of the vehicle body which is unstable in behavior of the vehicle body, the first state parameter being determined by the sum of the first and second state variables, the second state parameter being determined by a difference between the first and second state variables, said vehicle state estimating circuit classifying the state of behavior of the vehicle body into a plurality of different states based on the first and second state parameters.

14. A vehicle behavior control apparatus as set forth in claim 12, wherein said vehicle state estimating circuit classifies the state of behavior of the vehicle body into the different states by comparing the first state parameter with the second state parameter.

15. A vehicle behavior control apparatus as set forth in claim 13, wherein said vehicle state estimating circuit classifies the state of behavior of the vehicle body into the different states by comparing the first state parameter with the second state parameter.

16. A vehicle behavior control apparatus as set forth in claim 1, further comprising turning state detecting means for detecting a state of turning of the vehicle, and wherein said target braking effort determining circuit determines the target braking effort depending upon the state of turning of the vehicle.

17. A vehicle behavior control apparatus as set forth in claim 2, wherein said vehicle state estimating circuit includes wheel lift determining means for determining whether any of the wheels is lifted up from a road surface or not based on the speeds of the wheels and the lateral momentum of the vehicle body and uses a result of the determination as the state of behavior of the vehicle body.

18. A vehicle behavior control apparatus as set forth in claim 17, wherein said wheel lift determining means includes first-order lag momentum determining means for determining a time-lag momentum corresponding to a fist-order lag of the lateral momentum, and estimates a speed of the inside wheel during cornering of the vehicle based on a difference between the time-lag momentum and the speed of the outside wheel to determine whether the inside wheel during cornering of the vehicle is lifted up from the road surface or not based on the estimated speed of the inside wheel.

19. A vehicle behavior control apparatus as set forth in claim 17, wherein the wheels of the vehicle consists of a pair of front right and left wheels a pair of rear right and left wheels, and wherein said wheel lift determining means includes first-order lag momentum determining means for determining a time-lag momentum corresponding to a fist-order lag of the lateral momentum and wheel speed determining means for determining speeds of the inside and outside wheels during cornering of the vehicle, said wheel lift determining means subtracting the speed of the front inside wheel during cornering of the vehicle from a difference between the time-lag momentum and the speeds of the outside wheels to determine a front inside wheel lift parameter and subtracting the speed of the rear inside wheel during cornering of the vehicle from said difference to determine a rear inside wheel lift parameter.

20. A vehicle behavior control apparatus as set forth in claim 2, wherein said lateral momentum determining circuit includes one of a lateral acceleration sensor measuring a lateral acceleration acting on the vehicle body and a yaw rate sensor measuring a yaw rate of angular motion applied to the vehicle body.

21. A vehicle behavior control apparatus comprising:

wheel speed sensors measuring speeds of wheels;

brake actuators producing braking efforts applied to wheels of a vehicle;

a lateral momentum measuring sensor measuring lateral motion of the vehicle body to determine a vehicle state variable;

vehicle body portion state variable determining means for determining state variables of different portions of a vehicle body based on the speeds of the wheels;

state parameter determining means for determining one of a first state parameter indicating instability of the whole of the vehicle body and a second state parameter indicating a location of one of the portions of the vehicle body which is unstable in behavior of the vehicle body based on said vehicle state variable and the state variables;

a target braking effort determining circuit determining a target braking effort to be produced by each of said brake actuators based on the one of the first and second state parameters; and braking effort regulating means for regulating the braking efforts produced by said brake actuators so as to agree with the target braking efforts, respectively, to control behavior of the vehicle body.

22. A vehicle behavior control apparatus comprising:

a wheel speed sensor measuring speeds of wheels;

brake actuators producing braking efforts applied to wheels of a vehicle;

a lateral momentum determining circuit determining a lateral momentum of a vehicle body during traveling;

wheel lift determining means for determining whether any of the wheels is lifted away from a road surface or not based on the speeds of the wheels and the lateral momentum of the vehicle body; and actuator driving means for driving an actuator based on a result of the determination of said wheel lift determining means.

23. A vehicle behavior control apparatus as set forth in claim 22, wherein the wheels of the vehicle consists of a pair of front right and left wheels a pair of rear right and left wheels, and wherein said wheel lift determining means includes first-order lag momentum determining means for determining a time-lag momentum corresponding to a fist-order lag of the lateral momentum, wheel speed determining means for determining speeds of the inside and outside wheels during cornering of the vehicle, and lift parameter determining means for determining a front inside wheel lift parameter by subtracting the speed of the front inside wheel during cornering of the vehicle from a difference between the time-lag momentum and the speeds of the outside wheels and a rear inside wheel lift parameter by subtracting the speed of the rear inside wheel during cornering of the vehicle from said difference.

24. A vehicle behavior control apparatus as set forth in claim 22, wherein said lateral momentum determining circuit includes one of a lateral acceleration sensor measuring a lateral acceleration acting on the vehicle body and a yaw rate sensor measuring a yaw rate of angular motion applied to the vehicle body.

* * * * *